(12) United States Patent
Obie et al.

(10) Patent No.: US 9,874,914 B2
(45) Date of Patent: Jan. 23, 2018

(54) POWER MANAGEMENT CONTRACTS FOR ACCESSORY DEVICES

(71) Applicant: Microsoft Technology Licensing, LLC, Redmond, WA (US)

(72) Inventors: Gene Robert Obie, Clinton, WA (US); Heng Huang, Sammamish, WA (US); Yi He, Issaquah, WA (US); Duane Martin Evans, Snohomish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 14/281,518

(22) Filed: May 19, 2014

(65) Prior Publication Data

US 2015/0331463 A1   Nov. 19, 2015

(51) Int. Cl.
*G06F 1/26*     (2006.01)
*G06F 1/16*     (2006.01)
*G06F 21/44*   (2013.01)

(52) U.S. Cl.
CPC ............ *G06F 1/266* (2013.01); *G06F 1/1632* (2013.01); *G06F 21/44* (2013.01)

(58) Field of Classification Search
CPC ........ G06F 1/266; G06F 1/1632; G06F 21/44; G06F 1/26
USPC .......................................................... 713/300
See application file for complete search history.

(56) References Cited

U.S. PATENT DOCUMENTS

| 4,868,653 | A | 9/1989 | Golin et al. |
| 5,060,170 | A | 10/1991 | Bourgeois |
| 5,149,919 | A | 9/1992 | Greanias et al. |
| 5,241,682 | A | 8/1993 | Bryant et al. |
| 5,353,133 | A | 10/1994 | Bernkopf |
| 5,450,586 | A | 9/1995 | Kuzara et al. |
| 5,475,425 | A | 12/1995 | Przyborski et al. |

(Continued)

FOREIGN PATENT DOCUMENTS

| CN | 1622646 | 6/2005 |
| CN | 1830025 | 9/2006 |

(Continued)

OTHER PUBLICATIONS

"Final Office Action", U.S. Appl. No. 12/970,949, dated Jun. 10, 2015, 25 pages.

(Continued)

*Primary Examiner* — Nitin Patel

(57) ABSTRACT

Power management contracts for accessory devices are described. In one or more implementations, a power management contract is established for a system including a host computing device and an accessory device based at least in part upon power exchange conditions observed for the system. The power management contracts define operating constraints for power exchange between components of the system, including at least a power exchange direction and current limits. The host computing device and accessory devices are each configured to renegotiate the power management contract to dynamically change operating constraints in "real-time." Additionally, different power management contracts may be associated with identifying data corresponding to different types of accessory devices.

20 Claims, 7 Drawing Sheets

(56) References Cited

U.S. PATENT DOCUMENTS

| | | |
|---|---|---|
| 5,544,258 A | 8/1996 | Levien |
| 5,687,011 A | 11/1997 | Mowry |
| 5,717,957 A | 2/1998 | Lin |
| 5,778,404 A | 7/1998 | Capps et al. |
| 5,831,594 A | 11/1998 | Tognazzini et al. |
| 5,867,709 A | 2/1999 | Klencke |
| 5,903,566 A | 5/1999 | Flammer, III |
| 5,956,479 A | 9/1999 | McInerney et al. |
| 5,964,879 A | 10/1999 | Dunstan |
| 6,028,960 A | 2/2000 | Graf et al. |
| 6,151,643 A | 11/2000 | Cheng et al. |
| 6,167,337 A | 12/2000 | Gillick et al. |
| 6,167,377 A | 12/2000 | Gillick et al. |
| 6,185,528 B1 | 2/2001 | Fissore |
| 6,232,972 B1 | 5/2001 | Arcuri et al. |
| 6,263,308 B1 | 7/2001 | Heckerman et al. |
| 6,282,709 B1 | 8/2001 | Reha et al. |
| 6,283,858 B1 | 9/2001 | Hayes et al. |
| 6,297,825 B1 | 10/2001 | Madden et al. |
| 6,339,437 B1 | 1/2002 | Nielsen |
| 6,349,406 B1 | 2/2002 | Levine et al. |
| 6,374,369 B1 | 4/2002 | O'Donnell |
| 6,389,181 B2 | 5/2002 | Shaffer et al. |
| 6,452,597 B1 | 9/2002 | Goldberg et al. |
| 6,452,915 B1 | 9/2002 | Jorgensen |
| 6,603,491 B2 | 8/2003 | Lemelson et al. |
| 6,683,982 B1 | 1/2004 | Kohn |
| 6,757,027 B1 | 6/2004 | Edwards et al. |
| 6,847,386 B2 | 1/2005 | Paleiov |
| 6,854,073 B2 | 2/2005 | Bates et al. |
| 6,879,709 B2 | 4/2005 | Tian et al. |
| 6,934,370 B1 | 8/2005 | Leban et al. |
| 6,970,947 B2 | 11/2005 | Ebling et al. |
| 7,082,211 B2 | 7/2006 | Simon et al. |
| 7,146,296 B1 | 12/2006 | Carlbom et al. |
| 7,171,432 B2 | 1/2007 | Wildhagen |
| 7,194,114 B2 | 3/2007 | Schneiderman |
| 7,200,561 B2 | 4/2007 | Moriya et al. |
| 7,251,812 B1 | 7/2007 | Jhanwar et al. |
| 7,254,257 B2 | 8/2007 | Kim et al. |
| 7,337,112 B2 | 2/2008 | Moriya et al. |
| 7,370,043 B1 | 5/2008 | Shelton et al. |
| 7,380,003 B1 | 5/2008 | Guo et al. |
| 7,387,539 B2 | 6/2008 | Trenne |
| 7,400,439 B2 | 7/2008 | Holman |
| 7,443,791 B2 | 10/2008 | Barrett et al. |
| 7,443,807 B2 | 10/2008 | Cutler |
| 7,458,825 B2 | 12/2008 | Atsmon et al. |
| 7,466,986 B2 | 12/2008 | Halcrow et al. |
| 7,496,910 B2 | 2/2009 | Voskuil |
| 7,525,928 B2 | 4/2009 | Cutler |
| 7,551,754 B2 | 6/2009 | Steinberg et al. |
| 7,570,390 B2 | 8/2009 | Mitsunaga |
| 7,577,295 B2 | 8/2009 | Constantin et al. |
| 7,577,297 B2 | 8/2009 | Mori et al. |
| 7,580,952 B2 | 8/2009 | Logan et al. |
| 7,584,285 B2 | 9/2009 | Hudson et al. |
| 7,606,375 B2 | 10/2009 | Bailey et al. |
| 7,614,046 B2 | 11/2009 | Daniels et al. |
| 7,639,877 B2 | 12/2009 | Shiota et al. |
| 7,680,327 B2 | 3/2010 | Weiss |
| 7,690,042 B2 | 3/2010 | Rantalahti |
| 7,697,557 B2 | 4/2010 | Segel |
| 7,703,036 B2 | 4/2010 | Satterfield |
| 7,715,598 B2 | 5/2010 | Li et al. |
| 7,716,643 B2 | 5/2010 | Goldin |
| 7,729,902 B1 | 6/2010 | Gupta |
| 7,738,870 B2 | 6/2010 | Howard |
| 7,751,599 B2 | 7/2010 | Chen et al. |
| 7,756,538 B2 | 7/2010 | Bonta et al. |
| 7,765,194 B1 | 7/2010 | Sharma et al. |
| 7,766,498 B2 | 8/2010 | Sampsell |
| 7,779,367 B2 | 8/2010 | Oshiro et al. |
| 7,783,629 B2 | 8/2010 | Li et al. |
| 7,783,777 B1 | 8/2010 | Pabla et al. |
| 7,835,910 B1 | 11/2010 | Hakkani-Tur et al. |
| 7,864,967 B2 | 1/2011 | Takeuchi et al. |
| 7,865,952 B1 | 1/2011 | Hopwood et al. |
| 7,881,479 B2 | 2/2011 | Asada |
| 7,900,011 B2 | 3/2011 | Amundsen et al. |
| 7,959,308 B2 | 6/2011 | Freeman et al. |
| 7,970,350 B2 | 6/2011 | Sheynman et al. |
| 7,970,901 B2 | 6/2011 | Lipscomb et al. |
| 7,978,925 B1 | 7/2011 | Souchard |
| 8,015,006 B2 | 9/2011 | Kennewick et al. |
| 8,024,564 B2 | 9/2011 | Bassani et al. |
| 8,026,830 B2 | 9/2011 | Womble et al. |
| 8,074,213 B1 | 12/2011 | Holtz |
| 8,078,623 B2 | 12/2011 | Chou et al. |
| 8,091,074 B2 | 1/2012 | Lyon-Smith |
| 8,107,243 B2 | 1/2012 | Guccione et al. |
| 8,130,281 B2 | 3/2012 | Kaneda et al. |
| 8,149,748 B2 | 4/2012 | Bata et al. |
| 8,150,098 B2 | 4/2012 | Gallagher et al. |
| 8,154,384 B2 | 4/2012 | Hirai |
| 8,155,400 B2 | 4/2012 | Bronstein et al. |
| 8,165,352 B1 | 4/2012 | Mohanty |
| 8,170,298 B2 | 5/2012 | Li et al. |
| 8,189,807 B2 | 5/2012 | Cutler |
| 8,194,177 B2 | 6/2012 | Jung et al. |
| 8,212,294 B2 | 7/2012 | Hoke |
| 8,212,894 B2 | 7/2012 | Nozaki et al. |
| 8,213,333 B2 | 7/2012 | Greel et al. |
| 8,213,690 B2 | 7/2012 | Okada et al. |
| 8,224,036 B2 | 7/2012 | Maruyama et al. |
| 8,229,729 B2 | 7/2012 | Sarikaya et al. |
| 8,232,962 B2 | 7/2012 | Buck |
| 8,239,446 B2 | 8/2012 | Navar et al. |
| 8,245,043 B2 | 8/2012 | Cutler |
| 8,275,615 B2 | 9/2012 | Kozat et al. |
| 8,296,107 B2 | 10/2012 | Turner et al. |
| 8,296,673 B2 | 10/2012 | Lipstein et al. |
| 8,302,006 B2 | 10/2012 | Stanek et al. |
| 8,306,280 B2 | 11/2012 | Nozaki et al. |
| 8,316,237 B1 | 11/2012 | Felsher et al. |
| 8,321,220 B1 | 11/2012 | Chotimongkol et al. |
| 8,326,634 B2 | 12/2012 | Di Cristo et al. |
| 8,330,869 B2 | 12/2012 | Murashita et al. |
| 8,331,632 B1 | 12/2012 | Mohanty et al. |
| 8,335,851 B1 | 12/2012 | Vendrow |
| 8,345,934 B2 | 1/2013 | Obrador et al. |
| 8,346,563 B1 | 1/2013 | Hjelm et al. |
| 8,358,811 B2 | 1/2013 | Adams et al. |
| 8,364,717 B2 | 1/2013 | Delling et al. |
| 8,368,540 B2 | 2/2013 | Perkins et al. |
| 8,373,829 B2 | 2/2013 | Hara et al. |
| 8,374,122 B2 | 2/2013 | Meier et al. |
| 8,375,456 B2 | 2/2013 | Li et al. |
| 8,384,694 B2 | 2/2013 | Powell et al. |
| 8,384,791 B2 | 2/2013 | Porter et al. |
| 8,392,594 B2 | 3/2013 | Georgis et al. |
| 8,397,163 B1 | 3/2013 | Sran |
| 8,400,332 B2 | 3/2013 | Szwabowski et al. |
| 8,406,206 B2 | 3/2013 | Chiang |
| 8,407,472 B2 | 3/2013 | Hao et al. |
| 8,410,903 B2 | 4/2013 | Hirai |
| 8,412,521 B2 | 4/2013 | Mathias et al. |
| 8,413,198 B2 | 4/2013 | Connor et al. |
| 8,421,874 B2 | 4/2013 | Okamoto et al. |
| 8,448,847 B2 | 5/2013 | Lee |
| 8,468,548 B2 | 6/2013 | Kulkarni et al. |
| 8,484,314 B2 | 7/2013 | Luna et al. |
| 8,488,847 B2 | 7/2013 | Nozaki et al. |
| 8,493,992 B2 | 7/2013 | Sella et al. |
| 8,495,372 B2 | 7/2013 | Bailey et al. |
| 8,504,823 B2 | 8/2013 | Carpenter |
| 8,516,471 B2 | 8/2013 | Bhakta et al. |
| 8,522,209 B2 | 8/2013 | Wintergerst et al. |
| 8,526,683 B2 | 9/2013 | Maruyama et al. |
| 8,527,602 B1 | 9/2013 | Rasmussen et al. |
| 8,532,347 B2 | 9/2013 | Bourdev |
| 8,535,075 B1 | 9/2013 | Golko et al. |
| 8,538,091 B2 | 9/2013 | Kaneda et al. |
| 8,539,477 B2 | 9/2013 | Balascio et al. |

(56) References Cited

U.S. PATENT DOCUMENTS

| | | |
|---|---|---|
| 8,549,150 B1 | 10/2013 | Roseman et al. |
| 8,555,364 B2 | 10/2013 | Filippi et al. |
| 8,559,722 B2 | 10/2013 | Tsuji |
| 8,571,866 B2 | 10/2013 | Melamed et al. |
| 8,595,702 B2 | 11/2013 | Maybee et al. |
| 8,611,678 B2 | 12/2013 | Hanson et al. |
| 8,614,734 B2 | 12/2013 | Cutler |
| 8,619,062 B2 | 12/2013 | Powell et al. |
| 8,620,351 B2 | 12/2013 | Karaoguz |
| 8,620,649 B2 | 12/2013 | Gao |
| 8,624,994 B2 | 1/2014 | Kaneda et al. |
| 8,626,932 B2 | 1/2014 | Lydon et al. |
| 8,631,350 B2 | 1/2014 | Lepage et al. |
| 8,670,850 B2 | 3/2014 | Soulodre |
| 8,686,600 B2 | 4/2014 | Terlizzi et al. |
| 8,701,102 B2 | 4/2014 | Appiah et al. |
| 8,705,806 B2 | 4/2014 | Nakano |
| 8,719,603 B2 | 5/2014 | Belesiu |
| 8,756,507 B2 | 6/2014 | Fong et al. |
| 8,761,512 B1 | 6/2014 | Buddemeier |
| 8,776,166 B1 | 7/2014 | Erickson et al. |
| 8,839,222 B1 | 9/2014 | Brandwine et al. |
| 8,924,315 B2 | 12/2014 | Archambeau |
| 8,935,673 B1 | 1/2015 | Ashkenazi et al. |
| 9,017,092 B1 | 4/2015 | McCracken et al. |
| 9,058,311 B1 | 6/2015 | Bertz et al. |
| 9,088,891 B2 | 7/2015 | Belton et al. |
| 9,239,773 B1 | 1/2016 | Teplitsky et al. |
| 9,262,152 B1 | 2/2016 | Kurian et al. |
| 9,330,630 B2 | 5/2016 | Kerofsky |
| 9,367,490 B2 | 6/2016 | Huang et al. |
| 9,384,334 B2 | 7/2016 | Burba et al. |
| 9,384,335 B2 | 7/2016 | Hunt et al. |
| 9,324,323 B1 | 8/2016 | Bikel et al. |
| 9,460,493 B2 | 10/2016 | Suri et al. |
| 9,477,625 B2 | 10/2016 | Huang et al. |
| 9,510,125 B2 | 11/2016 | Raghuvanshi et al. |
| 9,606,788 B2 | 3/2017 | Nachimuthu et al. |
| 9,639,742 B2 | 5/2017 | Lee et al. |
| 9,703,681 B2 | 7/2017 | Taylor et al. |
| 9,717,006 B2 | 7/2017 | Haugen et al. |
| 9,720,548 B2 | 8/2017 | Powell |
| 9,773,156 B2 | 9/2017 | Chan et al. |
| 2001/0000356 A1 | 4/2001 | Woods |
| 2002/0078091 A1 | 6/2002 | Vu et al. |
| 2002/0083041 A1 | 6/2002 | Achlioptas |
| 2002/0101918 A1 | 8/2002 | Rodman et al. |
| 2002/0116171 A1 | 8/2002 | Russell |
| 2002/0143855 A1 | 10/2002 | Traversat et al. |
| 2002/0149924 A1 | 10/2002 | Falicoff et al. |
| 2003/0031177 A1 | 2/2003 | Robidas et al. |
| 2003/0064142 A1 | 4/2003 | Wagner et al. |
| 2003/0068100 A1 | 4/2003 | Covell et al. |
| 2003/0072486 A1 | 4/2003 | Loui et al. |
| 2003/0125948 A1 | 7/2003 | Lyudovyk |
| 2003/0182414 A1 | 9/2003 | O'Neill |
| 2003/0212543 A1 | 11/2003 | Epstein |
| 2003/0212544 A1 | 11/2003 | Acero |
| 2004/0032831 A1 | 2/2004 | Matthews |
| 2004/0040021 A1 | 2/2004 | Bharati et al. |
| 2004/0088187 A1 | 5/2004 | Chudy et al. |
| 2004/0088726 A1 | 5/2004 | Ma et al. |
| 2004/0168165 A1 | 8/2004 | Kokkinen |
| 2004/0210752 A1 | 10/2004 | Rao |
| 2004/0240711 A1 | 12/2004 | Hamza et al. |
| 2005/0039169 A1 | 2/2005 | Hsu et al. |
| 2005/0052427 A1 | 3/2005 | Wu et al. |
| 2005/0058297 A1 | 3/2005 | Jot et al. |
| 2005/0065789 A1 | 3/2005 | Yacoub |
| 2005/0091057 A1 | 4/2005 | Mark et al. |
| 2005/0114625 A1 | 5/2005 | Snyder |
| 2005/0144013 A1 | 6/2005 | Fujimoto et al. |
| 2005/0144616 A1 | 6/2005 | Hammond et al. |
| 2005/0163372 A1 | 7/2005 | Kida et al. |
| 2005/0165598 A1 | 7/2005 | Cote et al. |
| 2005/0165839 A1 | 7/2005 | Madan et al. |
| 2005/0177515 A1 | 8/2005 | Kalavade et al. |
| 2005/0177624 A1 | 8/2005 | Oswald et al. |
| 2005/0198407 A1 | 9/2005 | Lee |
| 2005/0245243 A1 | 11/2005 | Zuniga |
| 2006/0009996 A1 | 1/2006 | Lipscomb et al. |
| 2006/0034542 A1 | 2/2006 | Aoyama |
| 2006/0036965 A1 | 2/2006 | Harris et al. |
| 2006/0046709 A1 | 3/2006 | Krumm et al. |
| 2006/0058009 A1 | 3/2006 | Vogedes et al. |
| 2006/0088209 A1 | 4/2006 | Yu et al. |
| 2006/0155777 A1 | 7/2006 | Shih et al. |
| 2006/0156222 A1 | 7/2006 | Chi et al. |
| 2006/0174017 A1 | 8/2006 | Robertson |
| 2006/0200477 A1 | 9/2006 | Barrenechea |
| 2006/0212867 A1 | 9/2006 | Fields et al. |
| 2006/0244845 A1 | 11/2006 | Craig et al. |
| 2006/0250834 A1 | 11/2006 | Chinn et al. |
| 2006/0253491 A1 | 11/2006 | Gokturk |
| 2006/0277478 A1 | 12/2006 | Seraji et al. |
| 2006/0280341 A1 | 12/2006 | Koshizen |
| 2006/0287856 A1 | 12/2006 | He et al. |
| 2006/0290705 A1 | 12/2006 | White |
| 2007/0002478 A1 | 1/2007 | Mowry |
| 2007/0038436 A1 | 2/2007 | Cristo et al. |
| 2007/0053607 A1 | 3/2007 | Mitsunaga |
| 2007/0055752 A1 | 3/2007 | Wiegand et al. |
| 2007/0055936 A1 | 3/2007 | Dhanjal et al. |
| 2007/0058878 A1 | 3/2007 | Gomilla et al. |
| 2007/0074168 A1 | 3/2007 | Bates et al. |
| 2007/0128979 A1 | 6/2007 | Shackelford |
| 2007/0136324 A1 | 6/2007 | Xu et al. |
| 2007/0147318 A1 | 6/2007 | Ross et al. |
| 2007/0150428 A1 | 6/2007 | Webb |
| 2007/0156392 A1 | 7/2007 | Balchandran et al. |
| 2007/0157313 A1 | 7/2007 | Denton |
| 2007/0172099 A1 | 7/2007 | Park |
| 2007/0188477 A1 | 8/2007 | Rehm |
| 2007/0198950 A1 | 8/2007 | Dodge et al. |
| 2007/0203863 A1 | 8/2007 | Gupta |
| 2007/0226649 A1 | 9/2007 | Agmon |
| 2007/0233879 A1 | 10/2007 | Woods et al. |
| 2007/0234048 A1 | 10/2007 | Ziv |
| 2007/0271086 A1 | 11/2007 | Peters et al. |
| 2007/0294061 A1 | 12/2007 | Carlbom et al. |
| 2008/0004877 A1 | 1/2008 | Tian |
| 2008/0005114 A1 | 1/2008 | Li |
| 2008/0014563 A1 | 1/2008 | Visani |
| 2008/0037438 A1 | 2/2008 | Twiss et al. |
| 2008/0037442 A1 | 2/2008 | Bill |
| 2008/0046425 A1 | 2/2008 | Perski |
| 2008/0055278 A1 | 3/2008 | Locker et al. |
| 2008/0066181 A1 | 3/2008 | Haveson et al. |
| 2008/0069364 A1 | 3/2008 | Itou et al. |
| 2008/0089299 A1 | 4/2008 | Lindsley et al. |
| 2008/0089561 A1 | 4/2008 | Zhang |
| 2008/0137875 A1 | 6/2008 | Zong et al. |
| 2008/0143674 A1 | 6/2008 | Molander et al. |
| 2008/0165701 A1 | 7/2008 | Ananthanarayanan et al. |
| 2008/0175190 A1 | 7/2008 | Lee et al. |
| 2008/0183751 A1 | 7/2008 | Cazier et al. |
| 2008/0192820 A1 | 8/2008 | Brooks et al. |
| 2008/0195388 A1 | 8/2008 | Bower et al. |
| 2008/0204598 A1 | 8/2008 | Maurer et al. |
| 2008/0209354 A1 | 8/2008 | Stanek et al. |
| 2008/0212894 A1 | 9/2008 | Demirli et al. |
| 2008/0215183 A1 | 9/2008 | Chen |
| 2008/0235017 A1 | 9/2008 | Satomura |
| 2008/0253564 A1 | 10/2008 | Kahn et al. |
| 2008/0263130 A1 | 10/2008 | Michalowitz et al. |
| 2008/0273708 A1 | 11/2008 | Sandgren et al. |
| 2008/0313264 A1 | 12/2008 | Pestoni |
| 2009/0010623 A1 | 1/2009 | Date et al. |
| 2009/0028380 A1 | 1/2009 | Hillebrand et al. |
| 2009/0030697 A1 | 1/2009 | Cerra et al. |
| 2009/0046864 A1 | 2/2009 | Mahabub et al. |
| 2009/0055389 A1 | 2/2009 | Schilit et al. |
| 2009/0055461 A1 | 2/2009 | Georgis et al. |
| 2009/0083148 A1 | 3/2009 | Hwang et al. |

(56) References Cited

U.S. PATENT DOCUMENTS

| | | |
|---|---|---|
| 2009/0087099 A1 | 4/2009 | Nakamura |
| 2009/0089801 A1 | 4/2009 | Jones et al. |
| 2009/0100384 A1 | 4/2009 | Louch |
| 2009/0100459 A1 | 4/2009 | Riedl et al. |
| 2009/0100489 A1 | 4/2009 | Strothmann |
| 2009/0116749 A1 | 5/2009 | Cristinacce et al. |
| 2009/0144705 A1 | 6/2009 | Oda |
| 2009/0180671 A1 | 7/2009 | Lee |
| 2009/0185723 A1 | 7/2009 | Kurtz |
| 2009/0187593 A1 | 7/2009 | Chen et al. |
| 2009/0193445 A1 | 7/2009 | Thakker |
| 2009/0210328 A1 | 8/2009 | Fomenko et al. |
| 2009/0219405 A1 | 9/2009 | Kaneda et al. |
| 2009/0228820 A1 | 9/2009 | Kim et al. |
| 2009/0259667 A1 | 10/2009 | Wang et al. |
| 2009/0271735 A1 | 10/2009 | Anderson et al. |
| 2009/0292687 A1 | 11/2009 | Fan |
| 2009/0300596 A1 | 12/2009 | Tyhurst et al. |
| 2009/0313330 A1 | 12/2009 | Sakamoto |
| 2009/0313546 A1 | 12/2009 | Katpelly et al. |
| 2010/0004930 A1 | 1/2010 | Strope |
| 2010/0011123 A1 | 1/2010 | Dantzig et al. |
| 2010/0015956 A1 | 1/2010 | Qu et al. |
| 2010/0027663 A1 | 2/2010 | Dai et al. |
| 2010/0045682 A1 | 2/2010 | Ford et al. |
| 2010/0054544 A1 | 3/2010 | Arguelles |
| 2010/0076941 A1 | 3/2010 | Dotsenko et al. |
| 2010/0082478 A1 | 4/2010 | Van Der Veen et al. |
| 2010/0103117 A1 | 4/2010 | Townsend et al. |
| 2010/0111059 A1 | 5/2010 | Bappu et al. |
| 2010/0114890 A1 | 5/2010 | Hagar |
| 2010/0121954 A1 | 5/2010 | Yang et al. |
| 2010/0128863 A1 | 5/2010 | Krum et al. |
| 2010/0135038 A1 | 6/2010 | Handschy et al. |
| 2010/0141666 A1 | 6/2010 | Christopher et al. |
| 2010/0189313 A1 | 7/2010 | Prokoski |
| 2010/0205177 A1 | 8/2010 | Sato |
| 2010/0211695 A1 | 8/2010 | Steinmetz et al. |
| 2010/0211908 A1 | 8/2010 | Luk et al. |
| 2010/0229222 A1 | 9/2010 | Li et al. |
| 2010/0251206 A1 | 9/2010 | Horiuchi et al. |
| 2010/0251230 A1 | 9/2010 | O'Farrel et al. |
| 2010/0295774 A1 | 11/2010 | Hennessey |
| 2010/0312546 A1 | 12/2010 | Chang et al. |
| 2010/0329533 A1 | 12/2010 | Omi |
| 2011/0006603 A1* | 1/2011 | Robinson ............ G06F 1/263 307/31 |
| 2011/0007174 A1 | 1/2011 | Bacivarov et al. |
| 2011/0009075 A1 | 1/2011 | Jantunen et al. |
| 2011/0010171 A1 | 1/2011 | Talwar et al. |
| 2011/0010424 A1 | 1/2011 | Fox et al. |
| 2011/0016333 A1* | 1/2011 | Scott ............... G06F 1/266 713/300 |
| 2011/0023111 A1* | 1/2011 | Gunadisastra ......... G06F 21/34 726/16 |
| 2011/0043490 A1 | 2/2011 | Powell et al. |
| 2011/0052081 A1 | 3/2011 | Onoe et al. |
| 2011/0055901 A1 | 3/2011 | Karaoguz et al. |
| 2011/0055935 A1 | 3/2011 | Karaoguz et al. |
| 2011/0064331 A1 | 3/2011 | Andres Del Valle |
| 2011/0071841 A1 | 3/2011 | Fomenko et al. |
| 2011/0081023 A1 | 4/2011 | Raghuvanshi et al. |
| 2011/0087666 A1 | 4/2011 | Chou et al. |
| 2011/0091113 A1 | 4/2011 | Ito |
| 2011/0093459 A1 | 4/2011 | Dong et al. |
| 2011/0099538 A1 | 4/2011 | Pujala et al. |
| 2011/0129159 A1 | 6/2011 | Cifarelli |
| 2011/0135166 A1 | 6/2011 | Wechsler |
| 2011/0138064 A1 | 6/2011 | Rieger et al. |
| 2011/0144999 A1 | 6/2011 | Jang et al. |
| 2011/0153324 A1 | 6/2011 | Ballinger et al. |
| 2011/0158536 A1 | 6/2011 | Nakano |
| 2011/0010319 A1 | 7/2011 | Harada |
| 2011/0167181 A1* | 7/2011 | Minoo ............... G06F 1/266 710/73 |
| 2011/0173556 A1 | 7/2011 | Czerwinski et al. |
| 2011/0176058 A1 | 7/2011 | Biswas et al. |
| 2011/0177481 A1 | 7/2011 | Haff et al. |
| 2011/0179182 A1 | 7/2011 | Vadia et al. |
| 2011/0208980 A1 | 8/2011 | Brooks et al. |
| 2011/0225366 A1 | 9/2011 | Izadi et al. |
| 2011/0231676 A1 | 9/2011 | Atkins et al. |
| 2011/0283266 A1 | 11/2011 | Gallagher et al. |
| 2011/0289482 A1 | 11/2011 | Bentley |
| 2011/0321029 A1 | 12/2011 | Kern et al. |
| 2012/0014560 A1 | 1/2012 | Obrador et al. |
| 2012/0027311 A1 | 2/2012 | Cok |
| 2012/0029661 A1 | 2/2012 | Jones et al. |
| 2012/0030325 A1 | 2/2012 | Silverman et al. |
| 2012/0030682 A1 | 2/2012 | Shaffer et al. |
| 2012/0054624 A1 | 3/2012 | Owens, Jr. et al. |
| 2012/0065976 A1 | 3/2012 | Deng |
| 2012/0066642 A1 | 3/2012 | Shi |
| 2012/0071174 A1 | 3/2012 | Bao et al. |
| 2012/0072528 A1 | 3/2012 | Rimac et al. |
| 2012/0076427 A1 | 3/2012 | Hibino et al. |
| 2012/0078690 A1* | 3/2012 | Harriman ........... G06Q 30/0241 705/14.4 |
| 2012/0079372 A1 | 3/2012 | Kandekar et al. |
| 2012/0084086 A1 | 4/2012 | Gilbert |
| 2012/0096121 A1 | 4/2012 | Hao et al. |
| 2012/0106859 A1 | 5/2012 | Cheatle |
| 2012/0120678 A1 | 5/2012 | Su |
| 2012/0134139 A1 | 5/2012 | Jang et al. |
| 2012/0144288 A1 | 6/2012 | Caruso et al. |
| 2012/0148159 A1 | 6/2012 | Kaneda et al. |
| 2012/0169791 A1 | 7/2012 | Whitehead et al. |
| 2012/0179674 A1 | 7/2012 | Delling et al. |
| 2012/0188382 A1 | 7/2012 | Morrison et al. |
| 2012/0224388 A1 | 9/2012 | Lin |
| 2012/0225652 A1 | 9/2012 | Martinez et al. |
| 2012/0231862 A1 | 9/2012 | Yamamoto |
| 2012/0232787 A1 | 9/2012 | Kunath et al. |
| 2012/0232885 A1 | 9/2012 | Barbosa et al. |
| 2012/0235887 A1 | 9/2012 | Border et al. |
| 2012/0236184 A1 | 9/2012 | Jia et al. |
| 2012/0242598 A1 | 9/2012 | Won et al. |
| 2012/0245944 A1 | 9/2012 | Gruber |
| 2012/0246458 A1 | 9/2012 | Jain et al. |
| 2012/0250535 A1 | 10/2012 | Delling et al. |
| 2012/0253799 A1 | 10/2012 | Bangalore |
| 2012/0253802 A1 | 10/2012 | Heck et al. |
| 2012/0254086 A1 | 10/2012 | Deng |
| 2012/0254153 A1 | 10/2012 | Abraham et al. |
| 2012/0254161 A1 | 10/2012 | Zhang et al. |
| 2012/0254227 A1 | 10/2012 | Heck et al. |
| 2012/0256967 A1 | 10/2012 | Baldwin et al. |
| 2012/0265531 A1 | 10/2012 | Bennett |
| 2012/0266140 A1 | 10/2012 | Bates |
| 2012/0269355 A1 | 10/2012 | Chandak et al. |
| 2012/0271617 A1 | 10/2012 | Nakajima et al. |
| 2012/0278430 A1 | 11/2012 | Lehane et al. |
| 2012/0290293 A1 | 11/2012 | Hakkani-Tur et al. |
| 2012/0293543 A1 | 11/2012 | Jardine-Skinner |
| 2012/0303565 A1 | 11/2012 | Deng et al. |
| 2012/0308124 A1 | 12/2012 | Belhumeur et al. |
| 2012/0310523 A1 | 12/2012 | Delling et al. |
| 2012/0313865 A1 | 12/2012 | Pearce |
| 2012/0317197 A1 | 12/2012 | De Foy et al. |
| 2012/0324069 A1 | 12/2012 | Nori et al. |
| 2012/0327040 A1 | 12/2012 | Simon et al. |
| 2012/0327042 A1 | 12/2012 | Harley et al. |
| 2012/0330887 A1 | 12/2012 | Young et al. |
| 2012/0331102 A1 | 12/2012 | Ertugrul |
| 2012/0331111 A1 | 12/2012 | Wu et al. |
| 2013/0013936 A1 | 1/2013 | Lin et al. |
| 2013/0014050 A1 | 1/2013 | Queru |
| 2013/0016055 A1 | 1/2013 | Chuang |
| 2013/0019175 A1 | 1/2013 | Kotler et al. |
| 2013/0021373 A1 | 1/2013 | Vaught et al. |
| 2013/0031476 A1 | 1/2013 | Coin et al. |
| 2013/0058274 A1 | 3/2013 | Scherzer et al. |
| 2013/0065576 A1 | 3/2013 | Basir |
| 2013/0073725 A1 | 3/2013 | Bordeleau et al. |

(56) References Cited

U.S. PATENT DOCUMENTS

| | | |
|---|---|---|
| 2013/0078869 A1 | 3/2013 | Golko et al. |
| 2013/0085756 A1 | 4/2013 | Chotimongkol et al. |
| 2013/0086461 A1 | 4/2013 | Ashley-Rollman et al. |
| 2013/0086507 A1 | 4/2013 | Poston et al. |
| 2013/0091205 A1 | 4/2013 | Kotler et al. |
| 2013/0091440 A1 | 4/2013 | Kotler et al. |
| 2013/0091453 A1 | 4/2013 | Kotler |
| 2013/0091465 A1 | 4/2013 | Kikin-Gil et al. |
| 2013/0091534 A1 | 4/2013 | Gilde et al. |
| 2013/0094445 A1 | 4/2013 | De Foy et al. |
| 2013/0097481 A1 | 4/2013 | Kotler et al. |
| 2013/0097490 A1 | 4/2013 | Kotler et al. |
| 2013/0106725 A1 | 5/2013 | Bakken et al. |
| 2013/0106740 A1 | 5/2013 | Yilmaz et al. |
| 2013/0106977 A1 | 5/2013 | Chu et al. |
| 2013/0108065 A1 | 5/2013 | Mullins et al. |
| 2013/0115821 A1 | 5/2013 | Golko et al. |
| 2013/0117470 A1 | 5/2013 | Terlizzi et al. |
| 2013/0117658 A1 | 5/2013 | Fidler et al. |
| 2013/0127982 A1 | 5/2013 | Zhang et al. |
| 2013/0128364 A1 | 5/2013 | Wheeler et al. |
| 2013/0132614 A1* | 5/2013 | Bajpai ............... G06F 3/00 710/10 |
| 2013/0138436 A1 | 5/2013 | Yu |
| 2013/0148864 A1 | 6/2013 | Dolson et al. |
| 2013/0151441 A1 | 6/2013 | Archambeau |
| 2013/0151681 A1 | 6/2013 | Dournov et al. |
| 2013/0151975 A1 | 6/2013 | Shadi et al. |
| 2013/0152092 A1 | 6/2013 | Yadgar |
| 2013/0156275 A1 | 6/2013 | Amacker et al. |
| 2013/0159021 A1 | 6/2013 | Felsher |
| 2013/0166742 A1 | 6/2013 | Wiener et al. |
| 2013/0173604 A1 | 7/2013 | Li et al. |
| 2013/0174047 A1 | 7/2013 | Sivakumar et al. |
| 2013/0179067 A1 | 7/2013 | Trowbridge et al. |
| 2013/0185065 A1 | 7/2013 | Tzirkel-Hancock et al. |
| 2013/0188032 A1 | 7/2013 | Vertegaal |
| 2013/0191781 A1 | 7/2013 | Radakovitz et al. |
| 2013/0212484 A1 | 8/2013 | Joshi et al. |
| 2013/0217414 A1 | 8/2013 | Nagaraj |
| 2013/0226587 A1 | 8/2013 | Cheung |
| 2013/0227398 A1 | 8/2013 | Bolstad |
| 2013/0227415 A1 | 8/2013 | Gregg et al. |
| 2013/0231130 A1 | 9/2013 | Cherian et al. |
| 2013/0231862 A1 | 9/2013 | Delling et al. |
| 2013/0234913 A1 | 9/2013 | Thangadorai et al. |
| 2013/0238729 A1 | 9/2013 | Holzman et al. |
| 2013/0238819 A1* | 9/2013 | Oljaca ............... G06F 13/4081 710/15 |
| 2013/0242964 A1 | 9/2013 | Hassan et al. |
| 2013/0243328 A1 | 9/2013 | Irie |
| 2013/0252636 A1 | 9/2013 | Chang et al. |
| 2013/0254412 A1 | 9/2013 | Menezes et al. |
| 2013/0266196 A1 | 10/2013 | Kono |
| 2013/0275779 A1* | 10/2013 | He ............... G06F 1/26 713/300 |
| 2013/0293530 A1 | 11/2013 | Perez et al. |
| 2013/0297700 A1 | 11/2013 | Hayton et al. |
| 2013/0297769 A1 | 11/2013 | Chang et al. |
| 2013/0298185 A1 | 11/2013 | Koneru et al. |
| 2013/0305210 A1 | 11/2013 | Sharma et al. |
| 2013/0315235 A1 | 11/2013 | Foo |
| 2013/0317822 A1 | 11/2013 | Koshinaka |
| 2013/0318249 A1 | 11/2013 | McDonough et al. |
| 2013/0321390 A1 | 12/2013 | Latta et al. |
| 2013/0325148 A1 | 12/2013 | Mustafa et al. |
| 2013/0335301 A1 | 12/2013 | Wong et al. |
| 2013/0339478 A1 | 12/2013 | Edge |
| 2013/0342637 A1 | 12/2013 | Felkai et al. |
| 2013/0346494 A1 | 12/2013 | Nakfour et al. |
| 2014/0004741 A1 | 1/2014 | Jol et al. |
| 2014/0006420 A1 | 1/2014 | Sparrow et al. |
| 2014/0007215 A1 | 1/2014 | Romano et al. |
| 2014/0009109 A1* | 1/2014 | Lee ............... H02J 17/00 320/108 |
| 2014/0019626 A1 | 1/2014 | Hubler et al. |
| 2014/0019893 A1 | 1/2014 | Gudmundsson et al. |
| 2014/0019896 A1 | 1/2014 | Satterfield |
| 2014/0025380 A1 | 1/2014 | Koch et al. |
| 2014/0029859 A1 | 1/2014 | Libin |
| 2014/0046914 A1 | 2/2014 | Das et al. |
| 2014/0050419 A1 | 2/2014 | Lerios et al. |
| 2014/0072242 A1 | 3/2014 | Wei et al. |
| 2014/0075523 A1 | 3/2014 | Tuomaala et al. |
| 2014/0087355 A1 | 3/2014 | Henry et al. |
| 2014/0107921 A1 | 4/2014 | Delling et al. |
| 2014/0108979 A1 | 4/2014 | Davidson et al. |
| 2014/0141635 A1 | 5/2014 | Saunders |
| 2014/0157169 A1 | 6/2014 | Kikin-Gil |
| 2014/0173602 A1 | 6/2014 | Kikin-Gil et al. |
| 2014/0181708 A1 | 6/2014 | Kikin-Gil et al. |
| 2014/0210797 A1 | 7/2014 | Kreek et al. |
| 2014/0214410 A1 | 7/2014 | Jang |
| 2014/0222729 A1 | 8/2014 | Dasgupta et al. |
| 2014/0223334 A1 | 8/2014 | Jensen |
| 2014/0253522 A1 | 9/2014 | Cueto |
| 2014/0257803 A1 | 9/2014 | Yu et al. |
| 2014/0258405 A1 | 9/2014 | Perkin |
| 2014/0282415 A1 | 9/2014 | Ovadia et al. |
| 2014/0297412 A1 | 10/2014 | Fong et al. |
| 2014/0317602 A1 | 10/2014 | Zuo |
| 2014/0341443 A1 | 11/2014 | Cao |
| 2014/0358537 A1 | 12/2014 | Gilbert |
| 2014/0359593 A1 | 12/2014 | Cohen et al. |
| 2014/0359709 A1 | 12/2014 | Nassar |
| 2014/0372112 A1 | 12/2014 | Xue et al. |
| 2014/0379326 A1 | 12/2014 | Sarikaya et al. |
| 2015/0082291 A1 | 3/2015 | Thomas et al. |
| 2015/0082292 A1 | 3/2015 | Thomas et al. |
| 2015/0082293 A1 | 3/2015 | Thomas et al. |
| 2015/0082296 A1 | 3/2015 | Thomas et al. |
| 2015/0100312 A1 | 4/2015 | Bocchieri |
| 2015/0160961 A1 | 6/2015 | Johnson et al. |
| 2015/0161993 A1 | 6/2015 | Sainath |
| 2015/0161994 A1 | 6/2015 | Tang |
| 2015/0170020 A1 | 6/2015 | Garimella |
| 2015/0255061 A1 | 9/2015 | Xue et al. |
| 2015/0255069 A1 | 9/2015 | Adams et al. |
| 2015/0277682 A1 | 10/2015 | Kaufthal |
| 2015/0277708 A1 | 10/2015 | Rodrig et al. |
| 2015/0278191 A1 | 10/2015 | Levit et al. |
| 2015/0310040 A1 | 10/2015 | Chan et al. |
| 2015/0310261 A1 | 10/2015 | Lee et al. |
| 2015/0310858 A1 | 10/2015 | Li et al. |
| 2015/0317147 A1 | 11/2015 | Nachimuthu et al. |
| 2015/0317313 A1 | 11/2015 | Lv et al. |
| 2015/0317570 A1 | 11/2015 | Lee |
| 2015/0324555 A1 | 11/2015 | Burba et al. |
| 2015/0324556 A1 | 11/2015 | Hunt et al. |
| 2015/0324601 A1 | 11/2015 | Burba et al. |
| 2015/0325236 A1 | 11/2015 | Levit |
| 2015/0327068 A1 | 11/2015 | Hunt et al. |
| 2015/0331240 A1 | 11/2015 | Poulos |
| 2015/0347120 A1 | 12/2015 | Garg et al. |
| 2015/0347274 A1 | 12/2015 | Taylor |
| 2015/0347734 A1 | 12/2015 | Beigi |
| 2015/0350333 A1 | 12/2015 | Cutler et al. |
| 2015/0356759 A1 | 12/2015 | Delling et al. |
| 2015/0363339 A1 | 12/2015 | Huang et al. |
| 2015/0363919 A1 | 12/2015 | Suri et al. |
| 2015/0371409 A1 | 12/2015 | Negrila et al. |
| 2015/0373475 A1 | 12/2015 | Raghuvanshi et al. |
| 2015/0373546 A1 | 12/2015 | Haugen et al. |
| 2015/0378515 A1 | 12/2015 | Powell |
| 2015/0379353 A1 | 12/2015 | Mate et al. |
| 2016/0203125 A1 | 7/2016 | Sarikaya et al. |
| 2016/0210035 A1 | 7/2016 | Rodrig et al. |
| 2016/0217092 A1 | 7/2016 | Huang et al. |
| 2016/0239987 A1 | 8/2016 | Negrila et al. |
| 2016/0379343 A1 | 12/2016 | Suri et al. |
| 2017/0103753 A1 | 4/2017 | Levit et al. |
| 2017/0162201 A1 | 6/2017 | Boies et al. |

(56) References Cited

U.S. PATENT DOCUMENTS

| | | |
|---|---|---|
| 2017/0228583 A1 | 8/2017 | Lee |
| 2017/0257769 A1 | 9/2017 | Haugen et al. |

FOREIGN PATENT DOCUMENTS

| | | |
|---|---|---|
| CN | 101415039 | 4/2009 |
| CN | 101753404 | 6/2010 |
| CN | 102737099 | 10/2012 |
| CN | 102792320 | 11/2012 |
| EP | 0704655 | 4/1996 |
| EP | 0553101 | 7/1997 |
| EP | 0816981 | 7/1998 |
| EP | 1055872 | 11/2000 |
| EP | 1174787 | 1/2002 |
| EP | 1331566 | 7/2003 |
| EP | 1628197 | 2/2006 |
| EP | 1965389 | 9/2008 |
| EP | 1970803 | 9/2008 |
| EP | 2096577 | 9/2009 |
| EP | 2267655 | 12/2010 |
| EP | 2312462 | 4/2011 |
| EP | 2482572 | 8/2012 |
| EP | 2575128 | 4/2013 |
| EP | 2590274 | 5/2013 |
| EP | 2650752 | 10/2013 |
| EP | 2701457 | 2/2014 |
| GB | 2431001 | 4/2007 |
| JP | S56140430 | 11/1981 |
| JP | 2002091477 | 3/2002 |
| KR | 20040076079 | 8/2004 |
| KR | 20130022513 | 3/2013 |
| WO | WO-9304468 | 3/1993 |
| WO | WO-0125943 | 4/2001 |
| WO | WO-0250590 | 6/2002 |
| WO | WO-2005013262 | 2/2005 |
| WO | WO-2005033934 | 4/2005 |
| WO | WO-2008124181 | 10/2008 |
| WO | WO-2009015047 | 1/2009 |
| WO | WO-2009082814 | 7/2009 |
| WO | WO-2009089308 | 7/2009 |
| WO | WO-2009128021 | 10/2009 |
| WO | WO-2010141403 | 12/2010 |
| WO | WO-2011014138 | 2/2011 |
| WO | WO-2011150403 | 12/2011 |
| WO | WO-2012152817 | 11/2012 |
| WO | WO-2013008026 | 1/2013 |
| WO | WO-2013048510 | 4/2013 |
| WO | WO-2013154561 | 10/2013 |
| WO | WO-2013171481 | 11/2013 |
| WO | WO-2013184225 | 12/2013 |

OTHER PUBLICATIONS

"Final Office Action", U.S. Appl. No. 13/327,794, dated Nov. 20, 2014, 13 pages.
"Final Office Action", U.S. Appl. No. 13/530,015, dated Nov. 19, 2014, 48 pages.
"International Search Report and Written Opinion", Application No. PCT/US2015/030113, dated Aug. 7, 2015, 10 Pages.
"International Search Report and Written Opinion", Application No. PCT/US2015/030104, dated Aug. 7, 2015, 11 Pages.
"International Search Report and Written Opinion", Application No. PCT/US2015/030096, dated Aug. 19, 2015, 11 Pages.
"International Search Report and Written Opinion", Application No. PCT/US2015/032089, dated Jul. 31, 2015, 12 pages.
"International Search Report and Written Opinion", Application No. PCT/US2015/027409, dated Jul. 22, 2015, 13 pages.
"International Search Report and Written Opinion", Application No. PCT/US2015/028383, dated Jul. 24, 2015, 13 pages.
"International Search Report and Written Opinion", Application No. PCT/US2015/030153, dated Aug. 7, 2015, 13 Pages.
"International Search Report and Written Opinion", Application No. PCT/US2015/031270, dated Sep. 4, 2015, 16 Pages.

"Non-Final Office Action", U.S. Appl. No. 12/970,949, dated Jan. 2, 2015, 24 pages.
"Non-Final Office Action", U.S. Appl. No. 13/530,015, dated Apr. 28, 2015, 32 pages.
"Non-Final Office Action", U.S. Appl. No. 13/903,944, dated Mar. 27, 2015, 24 pages.
"Non-Final Office Action", U.S. Appl. No. 14/264,012, dated Jul. 31, 2015, 7 pages.
"Non-Final Office Action", U.S. Appl. No. 14/275,785, dated Aug. 26, 2015, 10 pages.
"Non-Final Office Action", U.S. Appl. No. 14/304,911, dated Jul. 17, 2015, 6 pages.
"Notice of Allowance", U.S. Appl. No. 12/970,939, dated Dec. 19, 2014, 10 pages.
"Notice of Allowance", U.S. Appl. No. 12/970,943, dated Dec. 19, 2014, 10 pages.
"Notice of Allowance", U.S. Appl. No. 13/026,058, dated Nov. 7, 2014, 5 pages.
"Notice of Allowance", U.S. Appl. No. 13/367,377, dated Feb. 7, 2012, 10 pages.
Malony, "Compensation of Measurement Overhead in Parallel Performance Profiling", The International Journal of High Performance Computing Applications, May 1, 2007, 23 pages.
Song, "Centralized Control of Wireless Sensor Networks for Real-Time Applications", Retrieved from the Internet: URL:http://citeseerx.ist.psu.edu/viewdoc/download?doi=I0.1.1.187.8761&rep=rep1&type=pdf, Retrieved on Jul. 9, 2015, Nov. 7, 2007, 8 Pages.
"Creating Interactive Virtual Auditory Environments", IEEE Computer Graphics and Applications, Aug. 2002, 10 pages.
"Final Office Action", U.S. Appl. No. 13/920,323, dated Sep. 24, 2015, 24 pages.
"Integrated Vapor Chamber for Thermal Management of Computing Devices", U.S. Appl. No. 14/294,040, filed Jun. 2, 2014, 27 pages.
"International Search Report and the Written Opinion", Application No. PCT/US2015/036595, dated Sep. 24, 2015, 10 pages.
"International Search Report and the Written Opinion", Application No. PCT/US2015/017872, dated Jun. 25, 2015, 11 pages.
"International Search Report and the Written Opinion", Application No. PCT/US2015/033545, dated Aug. 20, 2015, 11 pages.
"International Search Report and the Written Opinion", Application No. PCT/US2015/022887, dated Jun. 26, 2015, 12 pages.
"International Search Report and the Written Opinion", Application No. PCT/US2015/029334, dated Jul. 7, 2015, 12 pages.
"International Search Report and the Written Opinion", Application No. PCT/US2015/033872, dated Sep. 2, 2015, 12 pages.
"International Search Report and the Written Opinion", Application No. PCT/US2015/035219, dated Sep. 29, 2015, 12 pages.
"International Search Report and the Written Opinion", Application No. PCT/US2015/027689, dated Jul. 8, 2015, 13 pages.
"International Search Report and the Written Opinion", Application No. PCT/US2015/026971, dated Jul. 24, 2015, 15 pages.
"International Search Report and the Written Opinion", Application No. PCT/US2014/041023, dated Mar. 6, 2015, 17 pages.
"International Search Report and the Written Opinion", Application No. PCT/US2015/036767, dated Sep. 14, 2015, 19 pages.
"International Search Report and the Written Opinion", Application No. PCT/US2015/027688, dated Sep. 7, 2015, 9 pages.
"International Search Report and the Written Opinion", Application No. PCT/US2014/041014, dated Oct. 2, 2014, 9 pages.
"Non-Final Office Action", U.S. Appl. No. 13/923,917, dated May 28, 2015, 9 pages.
"Non-Final Office Action", U.S. Appl. No. 13/923,969, dated May 6, 2015, 7 pages.
"Non-Final Office Action", U.S. Appl. No. 14/201,704, dated Jul. 1, 2015, 6 pages.
"Non-Final Office Action", U.S. Appl. No. 14/266,795, dated Oct. 7, 2015, 10 pages.
"Non-Final Office Action", U.S. Appl. No. 14/273,100, dated Oct. 1, 2015, 20 pages.
"Non-Final Office Action", U.S. Appl. No. 14/275,724, dated Sep. 23, 2015, 8 pages.

(56) References Cited

OTHER PUBLICATIONS

"Non-Final Office Action", U.S. Appl. No. 14/275,761, dated Sep. 24, 2015, 8 pages.
"Notice of Allowance", U.S. Appl. No. 14/275,806, dated Oct. 8, 2015, 10 pages.
"Notice of Allowance", U.S. Appl. No. 14/312,562, dated Sep. 18, 2015, 13 pages.
"Restriction Requirement", U.S. Appl. No. 14/279,146, dated Sep. 3, 2015, 6 pages.
Ajwani, "Breadth First Search on Massive Graphs", In Proceedings of the 9th DIMACS Implementation Challenge: The Shortest Path Problem, Nov. 2006, 15 pages.
Barrett, "Implementations of Routing Algorithms for Transportation Networks", In Proceedings of the 9th DIMACS Implementation Challenge: The Shortest Path Problem, Nov. 2006, 19 pages.
Belhumeur, "Eigenfaces vs. Fisherfaces: Recognition Using Class Specific Linear Projection", IEEE Transactions on Pattern Analysis and Machine Intelligence, Jul. 1997, pp. 711-720.
Bohus, "Olympus: An Open-Source Framework for Conversational Spoken Language Interface Research", In Proceedings of the Workshop on Bridging the Gap: Academic and Industrial Research in Dialog Technologies, Apr. 2007, 8 pages.
Cao, "Face Recognition with Learning-based Descriptor", In Proceedings of the IEEE Conference on Computer Vision and Pattern Recognition (CVPR), Jun. 2010, 8 pages.
Chandrasekaran, "Sparse and Low-Rank Matrix Decompositions";, IFAC Symposium on System Identification, 2009, 6 pages.
Chen, "Bayesian Face Revisited: A Joint Formulation", In Proceedings of the 12th European Conference on Computer Vision (ECCV), Oct. 2012, 14 pages.
Chen, "Supplemental Material for Bayesian Face Revisited: A Joint Formulation", Apr. 2013, 5 pages.
Cootes, "Modeling Facial Shape and Appearance", Handbook of Face Recognition, Springer, New York, US, 2005, pp. 39-63.
Davis, "Information-Theoretic Metric Learning", In Proceedings of the 24th International Conference on Machine Learning (ICML), Jun. 2007, 8 pages.
Delano, "Integrated Development Environments for Natural Language Processing", Available at: http://www.textanalysis.com/TAI-IDE-WP.pdf, Oct. 2001, 13 pages.
Delling, "Customizable Route Planning", U.S. Appl. No. 13/152,313, filed Jun. 3, 2011, 23 pages.
Delling, "Customizable Route Planning", U.S. Appl. No. 13/868,135, filed Apr. 23, 2013, 33 pages.
Delling, "Customizing Driving Directions With GPUs", In Proceedings of the 20th Euro-Par International Conference on Parallel Processing, Aug. 2014, 12 pages.
Delling, "High-Performance Multi-Level Graphs", In Proceedings of the 9th DIMACS Implementation Challenge: The Shortest Path Problem, Nov. 2006, 13 pages.
Delling, "Highway Hierarchies Star", In Proceedings of the 9th DIMACS Implementation Challenge: The Shortest Path Problem, Nov. 2006, 29 pages.
Demetrescu, "The Shortest Path Problem: Ninth DIMACS Implementation Challenge", In Proceedings of DIMACS Series in Discrete Mathematics and Theoretical Computer Science, Jul. 28, 2009, 3 pages.
Diez, "Optimization of a Face Verification System Using Bayesian Screening Techniques", In Proceedings of the 23rd IASTED International Multi-Conference on Artificial Intelligence and Applications, Feb. 2005, pp. 427-432.
Ding, "Handbook of Face Recognition, Chapter 12: Facial Landmark Localization", Jan. 1, 2011, 19 pages.
Dos "LUP: A Language Understanding Platform", A Dissertation for the Degree of Master of Information Systems and Computer Engineering, Jul. 2012, 128 pages.
Eagle, "Common Sense Conversations: Understanding Casual Conversation using a Common Sense Database", In Proceedings of the Artificial Intelligence, Information Access, and Mobile Computing Workshop, Aug. 2003, 6 pages.
Edmonds, "Single-Source Shortest Paths With the Parallel Boost Graph Library", In Proceedings of the 9th DIMACS Implementation Challenge: The Shortest Path Problem, Nov. 4, 2006, 20 pages.
Geisberger, "Exact Routing in Large Road Networks using Contraction Hierarchies", In Proceedings of Transportation Science, vol. 46, No. 3, Aug. 2012, 17 pages.
Goldberg, "Better Landmarks within Reach", In Proceedings of the 6th International Conference on Experimental Algorithms, Jun. 6, 2007, 14 Pages.
Guillaumin, "Is that you? Metric Learning Approaches for Face Identification", In Proceedings of 12th IEEE International Conference on Computer Vision (ICCV), Sep. 2009, 8 pages.
He, "What is Discriminative Learning", Discriminative Learning for Speech Recognition Theory and Practice, Achorn International, Jun. 25, 2008, 25 pages.
Hoffmeister, "Log-linear Model Combination with Word-dependent Scaling Factors", Human Language Technology and Pattern Recognition Computer Science Department, 2009, 4 pages.
Huang, "Labeled Faces in the Wild: A Database for Studying Face Recognition in Unconstrained Environments", In Proceedings of the 10th European Conference on Computer Vision (ECCV), Oct. 2008, 11 pages.
Huang, "Unified Stochastic Engine (USE) for Speech Recognition", School of Computer Science, 1993, 4 pages.
Ioffe, "Probabilistic Linear Discriminant Analysis", International Journal of Computer Vision, Jun. 2001, 12 pages.
Karpinski, "Multi-GPU Parallel Memetic Algorithm for Capacitated Vehicle Routing Problem", Lecture Noes in Computer Science, May 8, 2014, 12 pages.
Keshtkar, "A Corpus-based Method for Extracting Paraphrases of Emotion Terms", Proceedings of the NAACL HLT 2010 Workshop on Computational Approaches to Analysis and Generation of Emotion in Text, 2010, 10 pages.
Ko, "Cammia—A Context-Aware Spoken Dialog System for Mobile Environments", In Automatic Speech Recognition and Understanding, Jul. 29, 2011, 2 pages.
Kumar, "Attribute and Simile Classifiers for Face Verification", In Proceedings of the 12th IEEE International Conference on Computer Vision (ICCV), Sep. 2009, 8 pages.
Kumar, "Describable Visual Attributes for Face Verification and Image Research", IEEE Transactions on Pattern Analysis and Machine Intelligence, Oct. 2011, 17 pages.
Kumar, "Face Recognition Using Gabor Wavelets", In Proceedings of the 40th IEEE Asilomar Conference on Signals, Systems and Computers, Oct. 2006, 5 pages.
Lanitis, "Toward Automatic Simulation of Aging Effects on Face Images", IEEE Trans. PAML, vol. 24, No. 4, Apr. 2002, 14 pages.
Lauther, "An Experimental Evaluation for Point-To-Point Shortest Path Calculation on Roadnetworks with Precalculated Edge-Flags", In Proceedings of the 9th DIMACS Implementation Challenge: The Shortest Path Problem, Nov. 2006, 18 pages.
Lee, "Intention-Based Corrective Feedback Generation using Context-Aware Model", In Proceedings of the Second International Conference on Computer Supported Education, Apr. 7, 2010, 8 pages.
Lei, "Face Recognition by Exploring Information Jointly in Space, Scale and Orientation", IEEE Transactions on Image Processing, Jan. 2011, pp. 247-256.
Li, "Bayesian Face Recognition Using Support Vector Machine and Face Clustering", In Proceedings of the IEEE Computer Society on Computer Vision Pattern and Recognition (CVPR), Jun. 2004, 7 pages.
Li, "Comparison of Discriminative Input and Output Transformations for Speaker Adaptation in the Hybrid NN/ HMM Systems", In Proceedings of 11th Annual Conference of the International Speech Communication Association, Sep. 26, 2010, 4 pages.
Li, "Probabilistic Models for Inference about Identity", IEEE Transactions on Pattern Recognition and Machine Intelligence, Jan. 2012, 16 pages.
Liang, "Face Alignment via Component-Based Discriminative Search", Computer Vision, ECCV 2008, Lecture Notes in Computer Science vol. 5303, 2008, 14 pages.

(56) References Cited

OTHER PUBLICATIONS

Martin, "CUDA Solutions for the SSSP Problem", in Proceedings of 9th International Conference Baton Rouge, May 25, 2009, 10 pages.
Moghaddam, "Bayesian Face Recognition", The Journal of Pattern Recognition, Nov. 2000, pp. 1771-1782.
Moreira, "Towards the Rapid Development of a Natural Language Understanding Module", In Proceedings of the 10th International Conference on Intelligent Virtual Agents, Jan. 2011, 7 pages.
Nguyen, "Cosine Similarity Metric Learning for Face Verification", In Proceedings of the 10th Asian Conference on Computer Vision (ACCV), Nov. 2010, 12 pages.
Ojala, "A Generalized Local Binary Pattern Operator for Multiresolution Gray Scale and Rotation Invariant Texture Classification", In Proceedings of the 2nd International Conference on Advances in Pattern Recognition (ICAPR), Mar. 2001, 10 pages.
Pascoal, "Implementations and Empirical Comparison of K Shortest Loopless Path Algorithms", In Proceedings of the 9th DIMACS Implementation Challenge: The Shortest Path Problem, Nov. 2006, 16 pages.
Phillips, "The FERET Evaluation Methodology for Face-Recognition Algorithms", IEEE Transactions on Pattern Analysis and Machine Intelligence, Oct. 2000, pp. 1090-1104.
Powell, "Increased Accuracy Corner Cube Arrays for High Resolution Retro-Reflective Imaging Applications", U.S. Appl. No. 62/062,732, filed Oct. 10, 2014, 46 pages.
Raghuvanshi, "Parametric Wave Field Coding for Precomputed Sound Propagation", Jul. 2014, 11 pages.
Ramanan, "Local Distance Functions: A Taxonomy, New Algorithms, and an Evaluation", IEEE Transactions on Pattern Analysis and Machine Intelligence, Apr. 2011, 8 pages.
Rodrig, "Command User Interface for Displaying and Scaling Selectable Controls and Commands", U.S. Appl. No. 14/254,681, filed Apr. 16, 2014, 51 pages.
Sanders, "Robust, Almost Constant Time Shortest-Path Queries in Road Networks", In Proceedings of the 9th DIMACS Implementation Challenge: The Shortest Path Problem, Nov. 2006, 19 pages.
Santos, "K Shortest Path Algorithms", In Proceedings of the 9th DIMACS Implementation Challenge: The Shortest Path Problem, Nov. 2006, 13 pages.
Sarukkai, "Word Set Probability Boosting for Improved Spontaneous Dialog Recognition", IEEE Transactions on Speech and Audio Processing, vol. 5, No. 5, Sep. 1997, 13 pages.
Seneff, "Galaxy-II: A Reference Architecture for Conversational System Development", In Proceedings of the 5th International Conference on Spoken Language Processing, Nov. 2008, 4 pages.
Seo, "Face Verification Using the LARK Representation", IEEE Transactions on Information Forensics and Security, Dec. 2011, 12 pages.
Sing, "Domain Metric Knowledge Model for Embodied Conversation Agents", In 5th International Conference on Research, Innovation & Vision for the Future, Mar. 5, 2007, 7 pages.
Susskind, "Modeling the joint density of two images under a variety of transformations", In Proceedings of the IEEE Computer Society Conference on Computer Vision and Pattern Recognition (CVPR), Jun. 2011, 8 pages.
Taigman, "Leveraging Billions of Faces to Overcome Performance Barriers in Unconstrained Face Recognition", Aug. 4, 2011, 7 pages.
Taigman, "Multiple One-Shots for Utilizing Class Label Information", In Proceedings of the British Machine Vision Conference (BMVC), Sep. 2009, 12 pages.
Tian, "Facial Expression Analysis", Handbook of Face Recognition, pp. 247-275.
Wang, "A Unified Framework for Subspace Face Recognition", retrieved at <<http://ieeexplore.ieee.org/Xplore/login.jsp?url=http%3A%2F%2Fieeexplore.ieee.org%2Fiel5%2F34%2F29188%2F01316855.pdf&authDecision=-203>>, Sep. 2004, pp. 1222-1228.
Wang, "Bayesian Face Recognition Using Gabor Features", In Proceedings of the ACM SIGMM Workshop on Biometrics Methods and Applications (WBMA), Nov. 8, 2003, pp. 70-73.
Wang, "Boosted Multi-Task Learning for Face Verification with Applications to Web Image and Video Search", In Proceedings of the IEEE Conference on Computer Vision and Pattern Recognition, Jun. 2009, 8 pages.
Wang, "Subspace Analysis Using Random Mixture Models", In Proceedings of the IEEE Computer Society Conference on Computer Vision and Pattern Recognition (CVPR), Jun. 2005, 7 pages.
Weinberger, "Distance Metric Learning for Large Margin Nearest Neighbor Classification", In Proceedings of the Conference on Advances in Neural Information Processing Systems (NIPS), Dec. 2008, 8 pages.
Xue, "Singular Value Decomposition Based Low-Footprint Speaker Adaptation and Personalization for Deep Neural Network", In Proceedings of the IEEE International Conference on Acoustics, Speech and Signal Processing, May 4, 2014, 5 pages.
Ying, "Distance Metric Learning with Eigenvalue Optimization", Journal of Machine Learning Research, Jan. 3, 2012, 26 pages.
Zhang, "Two-Dimensional Bayesian Subspace Analysis for Face Recognition", In Proceedings of the 4th International Symposium on Neutral Networks (ISNN), Jun. 2007, 7 pages.
Zhu, "A Rank-Order Distance based Clustering Algorithm for Face Tagging", In Proceedings of the IEEE Conference on Computer Vision and Pattern Recognition (CVPR), Jun. 2011, pp. 481-488.
"Corrected Notice of Allowance", U.S. Appl. No. 14/275,806, dated Nov. 3, 2015, 2 pages.
"Final Office Action", U.S. Appl. No. 14/304,911, dated Nov. 13, 2015, 7 pages.
"Final Office Action", U.S. Appl. No. 14/456,679, dated Nov. 2, 2015, 26 pages.
"International Search Report and Written Opinion", Application No. PCT/US2015/036587, dated Oct. 8, 2015, 11 Pages.
"International Search Report and Written Opinion", Application No. PCT/US2015/029805, dated Oct. 15, 2015, 20 pages.
"Non-Final Office Action", U.S. Appl. No. 14/279,146, dated Dec. 8, 2015, 9 pages.
"Non-Final Office Action", U.S. Appl. No. 14/312,501, dated Dec. 16, 2015, 14 pages.
"Notice of Allowance", U.S. Appl. No. 14/304,174, dated Dec. 14, 2015, 8 pages.
"Second Written Opinion", Application No. PCT/US2015/030104, dated Dec. 4, 2015, 7 pages.
"Second Written Opinion", Application No. PCT/US2015/030153, dated Dec. 4, 2015, 6 pages.
Cvetkovic, "Image enhancement circuit using nonlinear processing curve and constrained histogram range equalization", Visual Communications and Image Processing 2004, 2004, 12 pages.
Grasset, "Image-Driven View Management for Augmented Reality Browsers", IEEE International Symposium on Mixed and Augmented Reality (ISMAR), Nov. 5, 2012, 10 pages.
Rosten, "Real-time Video Annotations for Augmented Reality", Advances in Visual Computing Lecture Notes in Computer Science, Jan. 1, 2005, 8 pages.
Yin, "An Associate-Predict Model for Face Recognition", Proceedings of the IEEE Conference on Computer Vision and Pattern Recognition, Jun. 2011, 8 pages.
"Non-Final Office Action", U.S. Appl. No. 13/920,323, dated Feb. 27, 2015, 13 pages.
"Non-Final Office Action", U.S. Appl. No. 14/304,174, dated Jun. 29, 2015, 15 pages.
"GPU-Accelerated Route Planning", https://www.cs.unc.edu/cms/research/summaries/GPUAcceleratedRoutePlanning.pdf, Aug. 2005, 2 pages.
"Non-Final Office Action", U.S. Appl. No. 14/456,679, dated Jun. 19, 2015, 22 pages.
"Restriction Requirement", U.S. Appl. No. 14/275,785, dated Jun. 5, 2015, 6 pages.
Abraham, "Hierarchical Hub Labelings for Shortest Paths", In Technical Report MSR-TR-MSR-TR-2012-46, Apr. 2012.
Bast, "Route Planning in Transportation Networks", In Technical Report MSR-TR-2014-4, Jan. 8, 2014, 57 pages.

(56) References Cited

OTHER PUBLICATIONS

Bast, "Fast Routing in Road Networks with Transit Nodes", In Proceedings of Science, vol. 316, No. 5824, Apr. 27, 2007, p. 566.
Bleiweiss, "GPU Accelerated Pathfinding", In Proceedings of the 23rd ACM Siggraph/Eurographics symposium on Graphics hardware, Jun. 20, 2008, pp. 65-74.
Cormen, "Introduction to Algorithms", The MIT Press, Jul. 31, 2009, 43 pages.
Delling, "PHAST: Hardware-Accelerated Shortest Path Trees", In Journal of Parallel and Distributed Computing, vol. 73, No. 7, Jul. 2013, 11 pages.
Delling, "Graph Partitioning with Natural Cuts", In Proceedings of the IEEE International Parallel & Distributed Processing Symposium, May 16, 2011, 15 pages.
Delling, "Query Scenarios for Customizable Route Planning", U.S. Appl. No. 13/649,114, Oct. 11, 2012, 27 pages.
Delling, "Customizable Route Planning", In Proceedings of the 10th International Symposium on Experimental Algorithms, May 2011, pp. 1-12.
Delling, "Faster Customization of Road Networks", In Proceedings of the 12th International Symposium on Experimental Algorithms, Jun. 5, 2013, pp. 1-12.
Delling, "Customizable Route Planning in Road Networks", In Proceedings of the Sixth Annual Symposium on Combinatorial Search, Jul. 2011, pp. 1-31.
Dong, "Image Retargeting by Content-Aware Synthesis", IEEE Transactions on Visualization and Computer Graphics, vol. XX, No. XX, Jun. 2014, Mar. 26, 2014, 14 pages.
Efentakis, "Optimizing Landmark-Based Routing and Preprocessing", In Proceedings of the Sixth ACM SIGSPATIAL International Workshop on Computational Transportation Science, Nov. 5, 2013, 6 pages.
Geisberger, "Efficient Routing in Road Networks with Turn Costs", In Proceedings of the 10th International Conference on Experimental Algorithms, May 5, 2011, 12 pages.
Gooch, "Color2Gray: Salience-Preserving Color Removal", In Journal of ACM Transactions on Graphics, vol. 24 Issue 3, Jul. 2006.
Holzer, "Engineering Multilevel Overlay Graphs for Shortest-Path Queries", In ACM Journal of Experimental Algorithmics, vol. 13, Sep. 2008, 26 pages.
Kohler, "Fast Point-to-Point Shortest Path Computations with Arc-Flags", In Proceedings of Shortest Path Computations: Ninth DIMACS Challenge, vol. 24 of DIMACS Book. American Mathematical Society, Nov. 13, 2006, pp. 1-27.
Lilly, "Robust Speech Recognition Using Singular Value Decomposition Based Speech Enhancement", IEEE Tencon, 1997, 4 pages.
Lu, "Context Aware Textures", In Journal of ACM Transactions on Graphics, vol. 26 Issue 1, Jan. 2007, 31 pages.
Madduri, "Parallel Shortest Path Algorithms for Solving Large-Scale Instances", In Proceedings of 9th DIMACS Implementation Challenge—The Shortest Path Problem, Aug. 30, 2006, 39 pages.
Meyer, "D-Stepping: A Parallelizable Shortest Path Algorithm", In Journal of Algorithms, vol. 49, Issue 1, Oct. 2003, pp. 114-152.
Ortega-Arranz, "A New GPU-based Approach to the Shortest Path Problem", In Proceedings of International Conference on High Performance Computing and Simulation, Jul. 1, 2013, 7 pages.
Perumalla, "GPU-based Real-Time Execution of Vehicular Mobility Models in Large-Scale Road Network Scenarios", In ACM/IEEE/SCS 23rd Workshop on Principles of Advanced and Distributed Simulation, Jun. 22, 2009, 9 pages.
Shan, "Image Based Surface Detail Transfer", in IEEE Computer Graphics and Applications, vol. 24 Issue 3, May 2004, 6 pages.
Shen, "Agent-based Traffic Simulation and Traffic Signal Timing Optimization with GPU", 2011 14th International IEEE Conference on Intelligent Transportation Systems, Oct. 5, 2011, pp. 145-150.
Sommer, "Shortest-Path Queries in Static Networks", In Proceedings of ACM Computing Surveys, Apr. 7, 2014, 35 pages.
Wodecki, "Multi-GPU Parallel Memetic Algorithm for Capacitated Vehicle Routing Problem", In Proceedings of Distributed, Parallel, and Cluster Computing, Jan. 21, 2014, pp. 207-214.
"Acoustics—Measurement of room acoustic parameters—Part 1: Performance spaces", In ISO 3382-1:2009, May 6, 2014, 2 pages.
"Centrally Managed Wireless Networks", Retrieved From: <http://www.burconix.com/?p=services-centrally-managed-wireless> Nov. 18, 2013, Sep. 5, 2013, 2 Pages.
"Cisco Bring Your Own Device", Available at: http://www.cisco.com/c/en/us/td/docs/solutions/Enterprise/Borderless_Networks/Unified_Access/byodwp.html, Mar. 2014, 23 Pages.
"Connectify pro Full+Key 7 MB", Retrieved From: <http://zonreturn.blogspot.mx/2013/05/connectify-pro-fullkey-7-mb.html> Nov. 14, 2013, May 14, 2013, 5 Pages.
"Connecting to Multiple 802.11 Networks from One WiFi Card Simultaneously", Retrieved From: <http://marketplace.yet2.com/app/insight/techofweek/38576> Nov. 18, 2013, Jun. 20, 2012, 2 Pages.
"Debug Navigator Help: Using Debug Gauges", https://developer.apple.com/library/mac/recipes/xcode_help-debug_navigator/articles/using_debug_gauges.html#//apple_ref/doc/uid/TP40010432-CH8-SW1, May 28, 2014, 3 pages.
"Deployment Planning Tips for Office 365", http://technet.microsoft.com/en-us/library/hh852435.aspx, Oct. 14, 2012, 7 pages.
"Failover Cluster Step-by-Step Guide: Validating Hardware for a Failover Cluster", http://technet.microsoft.com/en-us/library/cc732035(v=ws.10).aspx, Mar. 20, 2011, 10 pages.
"Get history and other info about your code", <<http://msdn.microsoft.com/en-us/library/dn269218.aspx>>, retrieved May 23, 2014 10 pages.
"How to Set Up a Wireless Hotspot—From Ethernet (Windows 7)", Available At: <http://www.instructables.com/id/How-to-Set-Up-a-Wireless-Hotspot-Windows-7/>, Apr. 3, 2012, 8 pages.
"Interactive 3D Audio Rendering Guidelines, Level 2.0", In proceedings of 3D Working Group of the Interactive Audio Special Interest Group, Sep. 20, 1999, 29 pages.
"Interest Point Detection", Available at: http://en.wikipedia.org/wiki/Interest_point_detection, Apr. 21, 2014, 3 pages.
"Lifecycle Services for Microsoft Dynamics User Guide (LCS) [AX 2012]", Available at: http://technet.microsoft.com/en-us/library/dn268616.aspx, Aug. 8, 2013, 5 pages.
"Low-Footprint Adaptation and Personalization fora Deep Neural Network", U.S. Appl. No. 14/201,704, Mar. 7, 2014, 20 pages.
"Microsoft CodeLens Code Health Indicator extension", <<https://developer.apple.com/library/ios/documentation/ToolsLanguages/Conceptual/Xcode_Overview/DebugYourApp/DebugYourApp.html>>, Mar. 10, 2014, 13 pages.
"New CodeLens Indicator—Incoming Changes", <<http://msdn.microsoft.com/en-us/library/dn269218.aspx>>, retrieved May 23, 2014,, 8 pages.
"Secure Separation in Cisco Unified Data Center Architecture", Available at: http://www.cisco.com/en//solutions/collateral/ns340/ns414/ns742/ns743/ns1050/white_paper_c11-722425.html, Oct. 1, 2013, 8 pages.
"Shared Hidden Layer Combination for Speech Recognition Systems", U.S. Appl. No. 14/265,110, Apr. 29, 2014, 22 pages.
"Types of vCloud Hybrid Service", Available at: http://pubs.vmware.com/vchs/index.jsp?topic=%2FGUID-FD4D5E84-1AB8-4A1B-8C3F-769176FCD154%2FGUID-375065F3-110A-41384-99FA-FB8467361960.html, Dec. 16, 2012, 2 pages.
"UI Element Guidelines: Menus", Available at: https://developer.apple.com/library/mac/documentation/userexperience/conceptual/applehiguidelines/Menus/Menus.html, Sep. 26, 2011, 22 pages.
"Unified Communications Interoperability Forum and Open Networking Foundation Announce Collaborative Relationship Between Unified Communications and Software-Defined Networks", Retrieved From: <http://www.businesswire.com/news/home/20131120005275/en/Unified-Communications-Interoperability-Forum-Open-Networking-Foundation> Mar. 7, 2014, Nov. 20, 2013, 2 Pages.

(56) References Cited

OTHER PUBLICATIONS

"Unified Communications Managed API 3.0 Core SDK Documentation", retrieved from: http://msdn.microsoft.com/en-us/library/gg421023.aspx on Feb. 14, 2012, Dec. 1, 2011, 2 pages.
"Xcode OpenGL ES Tools Overview", Retrieved on: Jun. 5, 2014 Available at: https://developer.apple.com/library/prerelease/ios/documentation/3DDrawing/Conceptual/OpenGLES_ProgrammingGuide/ToolsOverview/ToolsOverview.html, 10 pages.
Abad, et al., "Context Dependent Modelling Approaches for Hybrid Speech Recognizers", In Proceeding of Interspeech, Sep. 26, 2010, 4 pages.
Abdel-Hamid, et al., "Fast Speaker Adaptation of Hybrid NN/HMM Model for Speech Recognition Based on Discriminative Learning of Speaker Code", In IEEE International Conference on Acoustics, Speech and Signal Processing, May 26, 2013, 5 pages.
Abid, et al., "A New Neural Network Pruning Method Based on the Singular Value Decomposition and the Weight Initialisation", In Proceedings of 11th European Signal Processing Conference, Sep. 3, 2002, 4 pages.
Ajdler, et al., "The Plenacoustic Function and Its Sampling", In IEEE Transactions on Signal Processing, vol. 54, Issue 10, Oct. 2006, 35 pages.
Ajmani, et al., "Scheduling and Simulation: How to Upgrade Distributed Systems", In Proceedings of the 9th conference on Hot Topics in Operating Systems, vol. 9., May 18, 2013, 6 pages.
Al-Hazmi, et al., "Virtualization of 802.11 Interfaces for Wireless Mesh Networks", In Proceeding: Eighth International Conference on Wireless On-Demand Network Systems and Services, Computer Networks and Computer Communications Lab University of Passau, 94032 Passau, Germany,Jan. 26, 2011, pp. 44-51.
Al-Kanj, et al., "Optimized Energy Efficient Content Distribution over Wireless Networks with Mobile-to-Mobile Cooperation", In Proceeding: The IEEE 17th International Conference on Telecommunications, Department of Electrical and Computer Engineering, American University of Beirut,Apr. 4, 2010, pp. 471-475.
Alt et al., "Increasing the User's Attention on the Web: Using Implicit Interaction Based on Gaze Behavior to Tailor Content", In Proceedings of the 7th Nordic Conference on Human-Computer Interaction—Making Sense through Design, Oct. 14, 2012, 10 pages.
Ananthanarayanan, et al., "Collaborative Downloading for Multihomed Wireless Devices", In Proceedings: Eighth IEEE Workshop on Mobile Computing Systems and Applications, Mar. 8, 2007, pp. 79-84.
Ananthanarayanan, et al., "Combine: Leveraging the Power of Wireless Peers through Collaborative Downloading", In Proceedings: The 5th International Conference on Mobile Systems, Applications and Services, Jun. 11, 2007, pp. 286-298.
Azizyan, et al., "SurroundSense: Mobile Phone Localization via Ambience Fingerprinting", In Proceedings of the 15th annual international conference on Mobile computing and networking, Sep. 20, 2009, 12 pages.
Barman, et al., "Nonnegative Matrix Factorization (NMF) Based Supervised Feature Selection and Adaptation", In Proceedings of the 9th International Conference on Intelligent Data Engineering and Automated Learning, Nov. 2, 2008, 2 pages.
Beymer, et al., "WebGazeAnalyzer: A System for Capturing and Analyzing Web Reading Behavior Using Eye Gaze", In Proceedings of Extended Abstracts on Human Factors in Computing Systems, Apr. 2, 2005, 10 pages.
Bonzi, et al., "The Use of Anaphoric Resolution for Document Description in Information Retrieval", In Proceedings of Information Processing & Management, vol. 25, Issue 4, Jun. 1989, 14 pages.
Bradley, et al., "Accuracy and Reproducibility of Auditorium Acoustics Measures", In Proceedings of British Institute of Acoustics, vol. 10, May 6, 2014, 2 pages.
Broder, "A Taxonomy of Web Search", In Proceedings of ACM SIGIR Forum, vol. 36, Issue 2, Sep. 2002, 8 pages.

Burges, "From Ranknet to Lambdarank to Lambdamart: An Overview", In Microsoft Research Technical Report MSR-TR-2010-82, Jun. 23, 2010, 19 pages.
Burges, "Learning to Rank with Nonsmooth Cost Functions", In Proceedings of the Advances in Neural Information Processing Systems, Dec. 2006, 8 pages.
Buscher, et al., "Generating and Using Gaze-Based Document Annotations", In Proceedings of Extended Abstracts on Human Factors in Computing Systems, Apr. 5, 2008, 6 pages.
Calamia, "Advances in Edge-Diffraction Modeling for Virtual-Acoustic Simulations", In Doctoral Dissertation of Princeton University, Jun. 2009, 159 pages.
Calian, "Passage-Level Evidence in Document Retrieval", In Proceedings of the 17th Annual International ACM SIGIR Conference on Research and Development in Information Retrieval, Jul. 3, 1994, 9 Pages.
Castro, et al., "A Probabilistic Room Location Service for Wireless Networked Environments", In Proceedings of the 3rd international conference on Ubiquitous Computing, Sep. 30, 2001, 19 pages.
Chandak, et al., "AD-Frustum: Adaptive Frustum Tracing for Interactive Sound Propagation", In IEEE Transactions on Visualization and Computer Graphics, vol. 14, Issue 6, Nov. 2008, 8 pages.
Chandra, et al., "MultiNet: Connecting to Multiple IEEE 802.11 Networks Using a Single Wireless Card", In Proceedings: IEEE INFOCOM, The 23rd Annual Joint Conference of the IEEE Computer and Communications Societies, Mar. 7, 2004, 12 Pages.
Chen, "Building Language Model on Continuous Space using Gaussian Mixture Models", In Proceedings of Research in Language Modeling, Jan. 2007, 66 pages.
Cheng, et al., "Entityrank: Searching Entities Directly and Holistically", In Proceedings of the 33rd International Conference on Very Large Data Bases, Sep. 23, 2007, 12 pages.
Cheng, et al., "Heritage and Early History of the Boundary Element Method", In Proceedings of Engineering Analysis with Boundary Elements, vol. 29, Issue 3, Mar. 2005, 35 pages.
Chi, et al., "Visual Foraging of Highlighted Text: An Eye-Tracking Study", In Proceedings of the 12th International Conference on Human-Computer Interaction—Intelligent Multimodal Interaction Environments, Jul. 22, 2007, 10 pages.
Choi, et al., "Face Annotation for Personal Photos Using Collaborative Face Recognition in Online Social Networks", In 16th International Conference on Digital Signal Processing, Jul. 5, 2009, 8 pages.
Choudhury, et al., "A Framework for Robust Online Video Contrast Enhancement Using Modularity Optimization", In IEEE Transactions on Circuits and Systems for Video Technology, vol. 22 , Issue: 9, Sep. 2012, 14 pages.
Clarke, "Exploiting Redundancy in Question Answering", In Proceedings of the 24th Annual International ACM SIGIR Conference on Research and Development in Information Retrieval, Sep. 9, 2001, 8 pages.
Cucerzan, "Large-Scale Named Entity Disambiguation Based on Wikipedia Data", In Proceedings of the Joint Conference on Empirical Methods in Natural Language Processing and Computational Natural Language Learning, Jun. 28, 2007, 9 Pages.
Dahl, et al., "Context-Dependent Pre-Trained Deep Neural Networks for Large Vocabulary Speech Recognition", In IEEE Transactions on Audio, Speech, and Language Processing, vol. 20, Issue 1, Jan. 1, 2012, 13 pages.
Dahl, et al., "Large Vocabulary Continuous Speech Recognition with Context-Dependent DBN-HMMs", In IEEE International Conference on Acoustics, Speech and Signal Processing, May 22, 2011, 4 pages.
Davis, et al., "Low-Rank Approximations for Conditional Feedforward Computation in Deep Neural Networks", In Proceedings of ArXiv preprint arXiv: 1312.4461, Dec. 2013, 10 Pages.
Edens, et al., "An Investigation of Broad Coverage Automatic Pronoun Resolution for Information Retrieval", In Proceedings of the 26th Annual International ACM SIGIR Conference on Research and Development in Information Retrieval, Jul. 28, 2003, 2 pages.
Elrakabawy, et al., "Peer-to-Peer File Transfer in Wireless Mesh Networks", In Proceeding: The Fourth Annual Conference on Wireless on Demand Network Systems and Services, University of

(56) References Cited

OTHER PUBLICATIONS

Leipzig Department of Computer Science Augustusplatz 10-11 04109 Leipzig, Germany,Jan. 24, 2007, pp. 114-121.
Fang, et al., "A Formal Study of Information Retrieval Heuristics", In Proceedings of the 27th Annual International ACM SIGIR Conference on Research and Development in Information Retrieval, Jul. 25, 2004, 8 pages.
Ferguson, "Five Key Criteria for adaptable SDN Wi-Fi", Retrieved From: <http://www.extremenetworks.com/five-key-criteria-for-adaptable-sdn-wi-fi/> Mar. 7, 2014, Nov. 25, 2013, 7 Pages.
Finkel, "Incorporating Non-Local Information into Information Extraction Systems by Gibbs Sampling", In Proceedings of the 43rd Annual Meeting on Association for Computational Linguistics, Jun. 2005, 8 pages.
Fiore, et al., "Information Density Estimation for Content Retrieval in MANETs", In Proceedings: The IEEE Transactions on Mobile Computing, vol. 8, Issue 3, Mar. 2009, pp. 289-303.
Florescu, et al., "Towards a Peer-Assisted Content Delivery Architecture", In Proceedings: The 18th International Conference on Control Systems and Computer Science, May 2011, 8 pages.
Funkhouser, et al., "A Beam Tracing Method for Interactive Architectural Acoustics", In Journal of the Acoustical Society of America, Feb. 2004, 18 pages.
Funkhouser, et al., "Realtime Acoustic Modeling for Distributed Virtual Environments", In Proceedings of the 26th annual conference on Computer graphics and interactive techniques, Jul. 1, 1999, 10 pages.
Gade, "Acoustics in Halls for Speech and Music", In Springer Handbook of Acoustics, May 6, 2014, 8 pages.
Gemello, et al., "Adaptation of Hybrid ANN/HMM Models Using Linear Hidden Transformations and Conservative Training", In IEEE International Conference on Acoustics, Speech and Signal Processing, May 14, 2006, 4 pages.
Goldstein, et al., "Summarizing Text Documents: Sentence Selection and Evaluation Metrics", In Proceedings of the 22nd Annual International ACM SIGIR Conference on Research and Development in Information Retrieval, Aug. 1, 1999, 8 pages.
Gruenstein, et al., "Context-Sensitive Language Modeling for Large Sets of Proper Nouns in Multimodal Dialogue Systems", In Proceedings of IEEE/ACL Workshop on Spoken Language Technology, Dec. 10, 2006, 4 pages.
Gumerov, et al., "Fast multipole methods on graphics processors", In Journal of Computational Physics, vol. 227, Issue 18, Sep. 10, 2008, 4 pages.
Harper, et al., "A Language Modelling Approach to Relevance Profiling for Document Browsing", In Proceedings of the 2nd ACM/IEEE-CS Joint Conference on Digital Libraries, Jul. 13, 2007, 8 pages.
Harper, et al., "Within-Document Retrieval: A User-Centred Evaluation of Relevance Profiling", In Journal of Information Retrieval, vol. 7, Issue 3-4, Sep. 2004, 26 pages.
Harris, "On the use of windows for harmonic analysis with the discrete Fourier transform", In Proceedings of the IEEE vol. 66, Issue 1, Jan. 1978, 33 pages.
Hawamdeh, et al., "Paragraph-based nearest neighbour searching in full-text documents", In Proceedings of Electronic Publishing, vol. 2, Dec. 1989, 14 pages.
Hearst, "Tilebars: Visualization of Term Distribution Information in Full Text Information Access", In Proceedings of the SIGCHI Conference on Human Factors in Computing Systems, May 7, 1995, 8 pages.
Heck, et al., "Robustness to Telephone Handset Distortion in Speaker Recognition by Discriminative Feature Design", In Journal of Speech Communication—Speaker Recognition and its Commercial and Forensic Applications, vol. 31, Issue 2-3, Jun. 2000, 12 pages.
Hefeeda, "A Framework for Cost-Effective Peer-to-Peer Content Distribution", In Proceedings: The Eleventh ACM International Conference on Multimedia, Department of Computer Sciences Purdue University, West Lafayette, IN 47907,Nov. 2, 2003, 2 Pages.

Hinton, et al., "Deep Neural Networks for Acoustic Modeling in Speech Recognition", In IEEE Signal Processing Magazine, vol. 29, Issue 6, Nov. 2012, 27 pages.
Hodgson, et al., "Experimental evaluation of radiosity for room sound-field prediction", In the Journal of the Acoustical Society of America, Aug. 2006, 12 pages.
Hsu, et al., "HBCI: Human-Building-Computer Interaction", In Proceedings of the 2nd ACM Workshop on Embedded Sensing Systems for Energy-Efficiency in Building, Nov. 2, 2010, 6 pages.
Jacob, "QR Directory App—Overview", In Blog of Josh Jacob Dev, Apr. 21, 2011, 3 pages.
Jaiswal, et al., "Bulk Content Delivery Using Co-Operating End-Nodes with Upload/Download Limits", In Proceedings: Fifth International Conference on Communication Systems and Networks, Bell Labs Research India, Bangalore, India,Sep. 10, 2012, 11 Pages.
Jaitly, et al., "Application of Pretrained Deep Neural Networks to Large Vocabulary Conversational Speech Recognition", In Proceedings of 13th Annual Conference of the International Speech Communication Association, Mar. 12, 2012, 11 pages.
Jluedemann, "Networking & wireless forum: How to set up Dual Network Adapters", Retrieved From: <http://forums.cnet.com/7723-7589_102-531538/how-to-set-up-dual-network-adapters/%20Internet%20is%20only%20available%20via%20an%20ATT%20MiFi%20hot%20spot.> Nov. 14, 2013, Jun. 27, 2011, 3 Pages.
Jones, "Automatic Summarising: The state of the Art", In Journal of Information Processing and Management: an International Journal, vol. 43, Issue 6, Nov. 1, 2007, 52 pages.
Kaszkiel, et al., "Effective Ranking with Arbitrary Passages", In Journal of the American Society for Information Science and Technology, vol. 52, Issue 4, Feb. 15, 2001, 21 pages.
Kaszkiel, et al., "Efficient Passage Ranking for Document Databases", In Journal of ACM Transactions on Information Systems, Oct. 1, 1999, 26 pages.
Keller, et al., "MicroCast: Cooperative Video Streaming on Smartphones", In Proceedings: The 10th International Conference on Mobile Systems, Applications, and Services, Jun. 25, 2012, 13 pages.
Kolarik, et al., "Perceiving Auditory Distance Using Level and Direct-to-Reverberant Ratio Cues", In the Journal of the Acoustical Society of America, Oct. 2011, 4 pages.
Konig, et al., "Nonlinear Discriminant Feature Extraction for Robust Text-Independent Speaker Recognition", In Proceeding of the RLA2C, ESCA workshop on Speaker Recognition and its Commercial and Forensic Applications, Apr. 1998, 4 pages.
Koo, et al., "Autonomous Construction of a WiFi Access Point Map Using Multidimensional Scaling", In Proceedings of the 9th international conference on Pervasive computing, Jun. 12, 2011, 18 pages.
Krokstad, "The Hundred Years Cycle in Room Acoustic Research and Design", In Proceedings of Reflections on sound, Jun. 2008, 30 pages.
Kumar, et al., "Gaze-Enhanced Scrolling Techniques", In Proceedings of the 20th Annual ACM Symposium on User Interface Software and Technology, Oct. 2007, 4 pages.
Kuttruff, "Room Acoustics, Fourth Edition", Available at: http://www.crcpress.com/product/isbn/9780419245803, Aug. 3, 2000, 1 page.
Laflen, et al., "Introducing New Features in the VSTS Database Edition GDR", http://msdn.microsoft.com/en-us/magazine/dd483214.aspx, Nov. 2008, 16 pages.
Lavrenko, et al., "Relevance-Based Language Models", In Proceedings of the 24th Annual International ACM SIGIR Conference on Research and Development in Information Retrieval, Sep. 9, 2001, 8 pages.
Lecouteux, et al., "Dynamic Combination of Automatic Speech Recognition Systems by Driven Decoding", In Journal of IEEE Transactions on Audio, Speech and Language Processing, Jan. 2013, 10 pages.
Li et al., "Roles of Pre-Training and Fine-Tuning in Context-Dependent DBN-HMMs for Real-Word Speech Recognition", In Proceeding of NIPS Workshop on Deep Learning and Unsupervised Feature Learning, Dec. 2010, 8 pages.

(56) References Cited

OTHER PUBLICATIONS

Li, et al., "Lattice Combination for Improved Speech Recognition", In Proceedings of the 7th International Conference of Spoken Language Processing, Sep. 16, 2002, 4 pages.

Li, et al., "Spatial Sound Rendering Using Measured Room Impulse Responses", In IEEE International Symposium on Signal Processing and Information Technology, Aug. 27, 2006, 5 pages.

Liao, "Speaker Adaptation of Context Dependent Deep Neural Networks", In IEEE International Conference on Acoustics, Speech and Signal Processing, May 26, 2013, 5 pages.

Lin, et al., "What Makes a Good Answer? The Role of Context in Question Answering", In Proceedings of the Ninth IFIP TC13 International Conference on Human-Computer Interaction, Sep. 2003, 8 pages.

Liu, et al., "Use of Contexts in Language Model Interpolation and Adaptation", In Journal of Computer Speech and Language vol. 27 Issue 1, Feb. 2009, 23 pages.

Loizides, et al., "The Myth of Find: User Behaviour and Attitudes Towards the Basic Search Feature", In Proceedings of the 8th ACM/IEEE-CS Joint Conference on Digital Libraries, Jun. 16, 2008, 4 pages.

Luo, et al., "UCAN: A Unified Cellular and AdHoc Network Architecture", In Proceedings: Ninth Annual International Conference on Mobile Computing and Networking, Sep. 14, 2013, 15 pages.

Lv, et al., "A Comparative Study of Methods for Estimating Query Language Models with Pseudo Feedback", In Proceedings of the 18th ACM Conference on Information and Knowledge Management, Nov. 2, 2009, 4 pages.

Lv, et al., "Positional Language Models for Information Retrieval", In Proceedings of the 32nd International ACM SIGIR Conference on Research and Development in Information Retrieval, Jul. 19, 2009, 8 pages.

Machiraju, et al., "Designing Multitenant Applications on Windows Azure", Available at: http://msdn.microsoft.com/en-us/library/windowsazure/hh689716.aspx, Apr. 18, 2013, 20 pages.

Manetti, et al., "Next Generation CDN services for Community Networks", In Proceedings: The Third International Conference on Next Generation Mobile Applications, Services and Technologies, Sep. 15, 2009, pp. 89-94.

Mavridis, et al., "Friends with Faces: How Social Networks Can Enhance Face Recognition and Vice Versa", In Proceedings of Computational Social Networks Analysis: Trends, Tools and Research Advances, May 24, 2010, 30 pages.

Mehra, et al., "An efficient GPU-based time domain solver for the acoustic wave equation", In Proceedings of Applied Acoustics, vol. 73, Issue 2, Feb. 2012, 13 pages.

Mehra, et al., "Wave-Based Sound Propagation in Large Open Scenes Using an Equivalent Source Formulation", In Journal of ACM transactions on Graphics, vol. 32, Issue 2, Apr. 1, 2013, 13 pages.

Mehrotra, et al., "nterpolation of Combined Head and Room Impulse Response for Audio Spatialization", In Proceeding of IEEE 13th International Workshop on Multimedia Signal Processing, Oct. 17, 2011, 6 pages.

Meinedo, et al., "Combination of Acoustic Models in Continuous Speech Recognition Hybrid Systems", In Proceedings of Sixth International Conference on Spoken Language Processing, Oct. 2000, 4 pages.

Menezes, et al., "Session-based Device Configuration", U.S. Appl. No. 14/257,502, 67 pages.

Mihalcea, et al., "Wikify!: Linking Documents to Encyclopedic Knowledge", In Proceedings of the Sixteenth ACM Conference on Conference on Information and Knowledge Management Nov. 6, 2007, 9 Pages.

Militano, et al., "Group Interactions in Wireless Cooperative Networks", In Proceedings: IEEE 73rd Conference on Vehicular Technology, May 15, 2011, 5 Pages.

Mohamed, et al., "Acoustic Modeling Using Deep Belief Networks", In IEEE Transactions on Audio, Speech, and Language Processing, vol. 20, Issue 1, Jan. 2012, 10 pages.

Motlicek, et al., "Feature and Score Level Combination of Subspace Gaussinasin LVCSR Task", In IEEE International Conference on Acoustics, Speech and Signal Processing, May 26, 2013, 5 pages.

Na, et al., "A 2-Poisson Model for Probabilistic Coreference of Named Entities for Improved Text Retrieval", In Proceedings of the 32nd International ACM SIGIR Conference on Research and Development in Information Retrieval, Jul. 19, 2009, 8 pages.

Neve, et al., "Face Recognition for Personal Photos using Online Social Network Context and Collaboration", In Guest Lecture at KAIST, Dec. 14, 2010, 54 pages.

Novak, et al., "Use of Non-Negative Matrix Factorization for Language Model Adaptation in a Lecture Transcription Task", In Proceedings of IEEE International Conference on Acoustics, Speech, and Signal Processing, vol. 1, May 7, 2001, 4 pages.

Papadopoulos, et al., "Image Clustering Through Community Detection on Hybrid Image Similarity Graphs", In 17th IEEE International Conference on Image Processing, Sep. 26, 2014, 4 pages.

Perenson, "In-depth Look at Google+ Photo Update with the Team that Designed it", Available at: http://connect.dpreview.com/post/1400574775/hands-on-with-google-plus-photo-update, May 17, 2013, 10 pages.

Peter, et al., "Frequency-domain edge diffraction for finite and infinite edges", In Proceedings of Acta acustica united with acustica, vol. 95, No. 3, May 6, 2014, 2 pages.

Petkova, et al., "Proximity-Based Document Representation for Named Entity Retrieval", In Proceedings of the Sixteenth ACM Conference on Conference on Information and Knowledge Management, Nov. 6, 2007, 10 pages.

Pierce, "An Introduction to Its Physical Principles and Applications", In Acoustical Society of America, Jun. 1989, 1 page.

Ponte, et al., "A Language Modelling Approach to Information Retrieval", In Proceedings of the 21st Annual International ACM SIGIR Conference on Research and Development in Information Retrieval, Aug. 1, 1998, 7 pages.

Poulos, et al., "Assisted Viewing of Web-based Resources", U.S. Appl. No. 14/161,693, filed Jan. 23, 2014, 48 pages.

Raghuvanshi, "Interactive Physically-based Sound Simulation", In UMI Dissertation, Sep. 9, 2011, 187 Pages.

Raghuvanshi, et al., "Efficient and Accurate Sound Propagation Using Adaptive Rectangular Decomposition", In IEEE Transactions on Visualization and Computer Graphics, vol. 15, Issue 99, Feb. 13, 2009, 13 pages.

Raghuvanshi, et al., "Precomputed wave simulation for real-time sound propagation of dynamic sources in complex scenes", In Journal of ACM Transactions on Graphics, vol. 29, Issue 4, Jul. 26, 2010, 11 pages.

Rindel, et al., "The Use of Colors, Animations and Auralizations in Room Acoustics", In Internoise, Sep. 15, 2013, 9 Pages.

Roberts, et al., "Evaluating Passage Retrieval Approaches for Question Answering", In Proceedings of 26th European Conference on Information Retrieval, Apr. 14, 2003, 8 pages.

Robertson, et al., "Okapi at TREC-3", In Proceedings of Text Retrieval Conference, Jan. 24, 2014, 19 pages.

Rouillard, "Contextual QR Codes", In Proceedings of the Third International Multi-Conference on Computing in the Global Information Technology, Jul. 27, 2008, 6 pages.

Sabine, "Room acoustics", In Transactions of the IRE Professional Group on Audio, vol. 1, Issue 4, Jul. 1953, 9 pages.

Sainath, et al., "Auto-Encoder Bottleneck Features Using Deep Belief Networks", In Proceedings of IEEE International Conference on Acoustics, Speech and Signal Processing, Mar. 25, 2012, 4 pages.

Sainath, et al., "Low-Rank Matrix Factorization for Deep Neural Network Training with High-Dimensional Output Targets", In proceedings of IEEE International Conference on Acoustics, Speech and Signal Processing, May 26, 2013, 5 pages.

Sainath, et al., "Making Deep Belief Networks Effective for Large Vocabulary Continuous Speech Recognition", In Proceedings of IEEE Workshop on Automatic Speech Recognition and Understanding, Dec. 11, 2011, 6 pages.

(56) References Cited

OTHER PUBLICATIONS

Sakamoto, et al., "Calculation of impulse responses and acoustic parameters in a hall by the finite-difference time-domain method", In Proceedings of Acoustical Science and Technology, vol. 29, Issue 4, Feb. 2008, 10 pages.

Saluja, et al., "Context-aware Language Modeling for Conversational Speech Translation", In Proceedings of Machine Translation Summit XIII, Sep. 19, 2011, 8 pages.

Sarukkai, et al., "Improved Spontaneous Dialogue Recognition Using Dialogue and Utterance Triggers by Adaptive Probability Boosting", In Fourth International Conference on Spoken Language, vol. 1, Oct. 3, 1996, 4 pages.

Sato, et al., "Incentive Mechanism Considering Variety of User Cost in P2P Content Sharing", In Proceeding: The IEEE Global Telecommunications Conference, Communications and Computer Engineering, Graduate School of Informatics, Kyoto University Yoshidahonnmachi, Sakyo-ku, Kyoto, 606-8501 Japan,Nov. 30, 2008, 5 Pages.

Satoh, et al., "Poster Abstract: Ambient Sound-based Proximity Detection with Smartphones", In Proceedings of the 11th ACM Conference on Embedded Networked Sensor Systems, Nov. 11, 2013, 2 pages.

Savioja, "Real-Time 3D Finite-Difference Time-Domain Simulation of Mid-Frequency Room Acoustics", In Proceedings of the 13th International Conference on Digital Audio Effects, Sep. 6, 2010, 8 pages.

Savioja, et al., "Simulation of room acoustics with a 3-D finite difference mesh", In Proceedings of the International Computer Music Conference, Sep. 1994, 4 pages.

Sbai, et al., "P2P Content Sharing in Spontaneous Multi-Hop Wireless Networks", In Proceedings: Second International Conference of Communication Systems and Networks, Jan. 5, 2010, 10 Pages.

Seide, et al., "Conversational Speech Transcription using Context-Dependent Deep Neural Networks", In Proceeding of 12th Annual Conference of the International Speech Communication Association, Aug. 28, 2011, 4 pages.

Shah, et al., "All Smiles: Automatic Photo Enhancement by Facial Expression Analysis", In Proceedings of Conference on Visual Media Production, Dec. 5, 2012, 10 pages.

Shanklin, "Samsung Galaxy S4 to Feature Eye-Tracking Technology", Available at: http://www.gizmag.com/galaxy-s4-eye-tracking-technology/26503/, Mar. 4, 2013, 5 pages.

Shieh, et al., "Seawall: Performance Isolation for Cloud Datacenter Networks", In Proceedings of the 2nd UNENIX Conference on Hot Topics in Cloud Computing, Jun. 22, 2010, 7 pages.

Singhal, et al., "Pivoted Document Length Normalization", In Proceedings of the 19th Annual International ACM SIGIR Conference on Research and Development in Information Retrieval, Aug. 18, 1996, 12 pages.

Singh-Miller, et al., "Dimensionality Reduction for Speech Recognition Using Neighborhood Components Analysis", In Proceedings of 8th Annual Conference of the International Speech Communication Association, Antwerp, Dec. 27, 2007, 4 pages.

Siniscalchi, et al., "Hermitian Based Hidden Activation Functions for Adaptation of Hybrid HMM/ANN Models", In Proceedings of 13th Annual Conference of the International Speech Communication Association,, Sep. 9, 2012, 4 pages.

So, et al., "Routing and Channel Assignment in Multi-Channel Multi-Hop Wireless Networks with Single-NIC Devices", In Proceeding: The Technical Report, Department of Computer Science, Department of Electrical and Computer Engineering, Coordinated Science Laboratory, University of Illinois at Urbana-Champaign, Dec. 2004, 12 Pages.

Song, et al., "Optimal Resource Utilization in Content Distribution Networks", In Proceedings: Technical Report of Computer Science, Dept. of Computer Science, Cornell University, Ithaca, NY 14853,Nov. 14, 2005, 14 Pages.

Starr, "Facial recognition app matches strangers to online profiles", Available at: http://www.cnet.com.au/facial-recognition-app-matches-strangers-to-online-profiles-339346355.htm, Jan. 7, 2014, 10 pages.

Stettner, et al., "Computer Graphics Visualization for Acoustic Simulation", In Proceedings of the 16th annual conference on Computer graphics and interactive techniques, vol. 23, No. 3, Jul. 1989, 12 pages.

Su, et al., "Error Back Propagation for Sequence Training of Context-Dependent Deep Networks for Conversational Speech Transcription", In IEEE International Conference on Acoustics, Speech, and Signal Processing, May 26, 2013, 5 pages.

Svensson, et al., "The use of Ambisonics in describing room impulse responses", In Proceedings of the International Congress on Acoustics, Apr. 2004, 4 pages.

Swietojanski, et al., "Revisiting Hybrid and GMM-HMM System Combination Techniques", In Proceeding of the IEEE International Conference on Acoustics, Speech and Signal Processing, May 26, 2013, 5 pages.

Takala, et al., "Sound rendering", In Proceedings of SIGGRAPH Computer Graphics, Jul. 1992, 11 pages.

Taylor, et al., "RESound: interactive sound rendering for dynamic virtual environments", In Proceedings of the 17th ACM international conference on Multimedia, Oct. 19, 2009, 10 pages.

Tellex, et al., "Quantitative Evaluation of Passage Retrieval Algorithms for Question Answering", In Proceedings of the 26th Annual International ACM SIGIR Conference on Research and Development in Information Retrieval, Jul. 28, 2003, 7 pages.

Thompson, "A review of finite-element methods for time-harmonic acoustics", In Journal of Acoustical Society of America, vol. 119, Issue 3, Mar. 2006, 16 pages.

Thouin, et al., "Video-on-Demand Networks: Design Approaches and Future Challenges", In Proceeding: The IEEE Network, vol. 21, Issue 2, Mar. 2007, pp. 42-48.

Tombros, et al., "Advantages of Query Biased Summaries in Information Retrieval", In Proceedings of the 21st Annual International ACM SIGIR Conference on Research and Development in Information Retrieval, Aug. 1, 1998, 9 Pages.

Trmal, et al., "Adaptation of a Feedforward Artificial Neural Network Using a Linear Transform", In Proceedings of in Text, Speech and Dialogue, Sep. 10, 2010, 8 pages.

Tsay, et al., "Personal Photo Organizer based on Automated Annotation Framework", In 5th International Conference on Intelligent Information Hiding and Multimedia Signal Processing, Sep. 12, 2009, 4 pages.

Tysowski, et al., "Peer to Peer Content Sharing on Ad Hoc Networks of Smartphones", In Proceedings: 7th International Conference of Wireless Communications and Mobile Computing, Jul. 4, 2011, pp. 1445-1450.

Valimaki, et al., "Fifty Years of Artificial Reverberation. Audio, Speech, and Language Processing", In IEEE Transactions on Audio, Speech, and Language Processing, vol. 20, Issue 5, Jul. 2012, 28 pages.

Van "Transform Coding of Audio Impulse Responses", In Master's Thesis of Delft University of Technology, Aug. 2003, 109 pages.

Van "Unified Communication and Collaboration from the User's Perspective", retrieved from: http://www.ucstrategies.com/unified-communications-expert-views/unified-communication-and-collaboration-from-the-users-perspective.aspx on Dec. 8, 2009, Dec. 8, 2009, 2 pages.

Vanhoucke, et al., "Improving the Speed of Neural Networks on CPUs", In Proceedings of NIPS Workshop on Deep Learning and Unsupervised Feature Learning, Dec. 16, 2011, 8 pages.

Wu, et al., "Adapting Boosting for Information Retrieval Measures", In Journal of Information Retrieval, vol. 13, Issue 3, Jun. 1, 2010, 17 pages.

Xu, et al., "User-Oriented Document Summarization through Vision-Based Eye-Tracking", In Proceedings of the 14th International Conference on Intelligent User Interfaces, Feb. 8, 2009, 10 pages.

Xue, et al., "Restructuring Deep Neural Network Acoustic Models", U.S. Appl. No. 13/920,323, Jun. 18, 2013, 30 pages.

(56) References Cited

OTHER PUBLICATIONS

Xue, et al., "Restructuring of Deep Neural Network Acoustic Models with Singular Value Decomposition", In Proceedings of 14th Annual Conference of the International Speech Communication Association,, Aug. 25, 2013, 5 pages.
Yan, et al., "A Scalable Approach to Using DSS-Derived Features in GMM-HMM Based Acoustic Modeling for LVCSR", In Proceeding of the 14th Annual Conference of the International Speech Communication Association, Aug. 25, 2013, 5 pages.
Yang, et al., "Qualifier in TREC-12 QA Main Task", In Proceedings of the Twelfth Text Retrieval Conference, Nov. 2003, 9 Pages.
Yao, et al., "Adaptation of Context-Dependent Deep Neural Networks for Automatic Speech Recognition", In IEEE Spoken Language Technology Workshop, Dec. 2, 2012, 4 pages.
Yeh, et al., "Wave-ray Coupling for Interactive Sound Propagation in Large Complex Scenes", In Journal of ACM Transactions on Graphics, vol. 32 Issue 6, Nov. 2013, 10 pages.
Yu, et al., "Exploiting Sparseness in Deep Neural Networks for Large Vocabulary Speech Recognition", In Proceeding of IEEE International Conference on Acoustics, Speech and Signal Processing, Mar. 25, 2012, 4 pages.
Yu, et al., "Improved Bottleneck Features Using Pretrained Deep Neural Networks", In Proceedings of 12th Annual Conference of the International Speech Communication Association, Aug. 28, 2011, 4 pages.
Yu, et al., "KL-Divergence Regularized Deep Neural Network Adaptation for Improved Large Vocabulary Speech Recognition", In IEEE International Conference on Acoustics, Speech and Signal Processing, May 26, 2013, 5 pages.
Zhai, et al., "A Study of Smoothing Methods for Language Models Applied to Ad Hoc Information Retrieval", In Proceedings of the 24th Annual International ACM SIGIR Conference on Research and Development in Information Retrieval, Sep. 9, 2009, 9 Pages.
Zwol, et al., "Prediction of Favourite Photos using Social, Visual, and Textual.Signals", In Proceedings of the International Conference on Multimedia, Oct. 25, 2010, 4 pages.
Adams, "The Next Generation of USB Connector Will Plug in Either Way", Retrieved From: <http://www.popsci.com/article/gadgets/next-generation-usb-connector-will-plug-either-way> May 16, 2014, Dec. 4, 2013, 3 Pages.
Hughes, "Apple's Lightning Port Dynamically Assigns Pins to Allow for Reversible Use", Retrieved From: <http://appleinsider.com/articles/12/09/25/apples_lightning_port_dynamically_assigns_pins_to_allow_for_reversible_use> May 16, 2014, Sep. 25, 2012, 9 pages.
"Advisory Action", U.S. Appl. No. 14/304,911, dated Jan. 14, 2016, 2 pages.
"Corrected Notice of Allowance", U.S. Appl. No. 14/275,806, dated May 5, 2016, 2 pages.
"Corrected Notice of Allowance", U.S. Appl. No. 14/275,806, dated Jun. 2, 2016, 2 pages.
"Final Office Action", U.S. Appl. No. 13/923,917, dated Sep. 29, 2015, 6 pages.
"Final Office Action", U.S. Appl. No. 14/266,795, dated Apr. 11, 2016, 12 pages.
"Final Office Action", U.S. Appl. No. 14/273,100, dated Mar. 3, 2016, 18 pages.
"Final Office Action", U.S. Appl. No. 14/275,274, dated Jan. 29, 2016, 6 pages.
"Final Office Action", U.S. Appl. No. 14/275,761, dated Dec. 18, 2015, 6 pages.
"Final Office Action", U.S. Appl. No. 14/275,785, dated Feb. 9, 2016, 11 pages.
"Final Office Action", U.S. Appl. No. 14/279,146, dated Apr. 13, 2016, 16 pages.
"Final Office Action", U.S. Appl. No. 14/312,501, dated May 27, 2016, 13 pages.
"Flexible Schema for Language Model Customization", U.S. Appl. No. 14/227,492, filed Mar. 27, 2014, 20 pages.
"International Preliminary Report on Patentability", Application No. PCT/US2014/041014, dated Sep. 15, 2015, 6 pages.
"International Preliminary Report on Patentability", Application No. PCT/US2015/027688, dated Apr. 26, 2016, 7 pages.
"International Preliminary Report on Patentability", Application No. PCT/US2014/041023, dated Nov. 13, 2015, 7 pages.
"International Preliminary Report on Patentability", Application No. PCT/US2015/017872, dated Dec. 14, 2015, 7 pages.
"International Preliminary Report on Patentability", Application No. PCT/US2015/022887, dated Apr. 7, 2016, 8 pages.
"International Preliminary Report on Patentability", Application No. PCT/US2015/030104, dated Apr. 15, 2016, 8 pages.
"International Preliminary Report on Patentability", Application No. PCT/US2015/030153, dated Apr. 15, 2016, 8 pages.
"International Search Report and Written Opinion", Application No. PCT/US20156/021921, dated Jul. 7, 2015, 11 pages.
"International Search Report and Written Opinion", Application No. PCT/US2015/022886, dated Aug. 31, 2015, 17 pages.
"International Search Report and Written Opinion", Application No. PCT/US2015/036859, dated Dec. 22, 2015, 17 pages.
"International Search Report and Written Opinion", Application No. PCT/US2015/035218, dated May 19, 2016, 19 pages.
"Invitation to Pay Additional Fees/Partial International Search Report", Application No. PCT/US2015/033950, dated Feb. 23, 2016, 6 pages.
"Non-Final Office Action", U.S. Appl. No. 13/920,323, dated Apr. 5, 2016, 22 pages.
"Non-Final Office Action", U.S. Appl. No. 14/227,492, dated Aug. 13, 2015, 36 pages.
"Non-Final Office Action", U.S. Appl. No. 14/264,012, dated Mar. 10, 2016, 7 pages.
"Non-Final Office Action", U.S. Appl. No. 14/264,619, dated Apr. 19, 2016, 11 pages.
"Non-Final Office Action", U.S. Appl. No. 14/265,110, dated Jan. 4, 2016, 26 pages.
"Non-Final Office Action", U.S. Appl. No. 14/268,953, dated Apr. 19, 2016, 14 pages.
"Non-Final Office Action", U.S. Appl. No. 14/311,208, dated Jan. 7, 2016, 6 pages.
"Non-Final Office Action", U.S. Appl. No. 14/456,679, dated May 10, 2016, 31 pages.
"Non-Final Office Action", U.S. Appl. No. 14/465,679, dated May 10, 2016, 31 pages.
"Notice of Allowance", U.S. Appl. No. 13/923,917, dated Mar. 4, 2016, 5 pages.
"Notice of Allowance", U.S. Appl. No. 13/923,917, dated Dec. 15, 2015, 7 pages.
"Notice of Allowance", U.S. Appl. No. 13/923,969, dated Oct. 1, 2015, 7 pages.
"Notice of Allowance", U.S. Appl. No. 13/923,969, dated Nov. 30, 2015, 5 pages.
"Notice of Allowance", U.S. Appl. No. 14/201,704, dated Dec. 18, 2015, 7 pages.
"Notice of Allowance", U.S. Appl. No. 14/227,492, dated Apr. 19, 2016, 15 pages.
"Notice of Allowance", U.S. Appl. No. 14/254,681, dated Dec. 4, 2015, 9 pages.
"Notice of Allowance", U.S. Appl. No. 14/264,012, dated Dec. 18, 2015, 7 pages.
"Notice of Allowance", U.S. Appl. No. 14/275,724, dated May 9, 2016, 5 pages.
"Notice of Allowance", U.S. Appl. No. 14/275,761, dated Mar. 2, 2016, 5 pages.
"Notice of Allowance", U.S. Appl. No. 14/275,806, dated Feb. 25, 2016, 9 pages.
"Notice of Allowance", U.S. Appl. No. 14/304,911, dated Feb. 19, 2016, 7 pages.
"Notice of Allowance", U.S. Appl. No. 14/304,911, dated May 23, 2016, 7 pages.
"Notice of Allowance", U.S. Appl. No. 14/311,208, dated Mar. 30, 2016, 8 pages.
"Notice of Allowance", U.S. Appl. No. 14/312,562, dated Jan. 7, 2016, 9 pages.

(56) References Cited

OTHER PUBLICATIONS

"Notice of Allowance", U.S. Appl. No. 15/087,739, dated Jun. 13, 2016, 9 pages.
"Preinterview First Office Action", U.S. Appl. No. 14/444,987, dated Mar. 3, 2016, 4 pages.
"Ribbon Layout and Resizing", Retrieved on Mar. 12,2014 at: https://msdn.microsoft.com/en-us/library/ff701790, 6 pages.
"Second Written Opinion", Application No. PCT/US2015/021921, dated Feb. 11, 2016, 7 pages.
"Second Written Opinion", Application No. PCT/US2015/022887, dated Jan. 7, 2016, 5 pages.
"Second Written Opinion", Application No. PCT/US2015/026971, dated Mar. 30, 2016, 7 pages.
"Second Written Opinion", Application No. PCT/US2015/027409, dated Mar. 18, 2016, 8 pages.
"Second Written Opinion", Application No. PCT/US2015/027688, dated Feb. 9, 2016, 6 pages.
"Second Written Opinion", Application No. PCT/US2015/027689, dated Apr. 1, 2016, 8 pages.
"Second Written Opinion", Application No. PCT/US2015/028383, dated Apr. 18, 2016, 9 pages.
"Second Written Opinion", Application No. PCT/US2015/029334, dated Mar. 31, 2016, 5 pages.
"Second Written Opinion", Application No. PCT/US2015/029805, dated May 6, 2016, 9 pages.
"Second Written Opinion", Application No. PCT/US2015/030096, dated Apr. 5, 2016, 6 Pages.
"Second Written Opinion", Application No. PCT/US2015/030113, dated Mar. 21, 2016, 8 pages.
"Second Written Opinion", Application No. PCT/US2015/031270, dated May 3, 2016, 9 pages.
"Second Written Opinion", Application No. PCT/US2015/032089, dated Apr. 12, 2016, 8 pages.
"Second Written Opinion", Application No. PCT/US2015/033872, dated Apr. 21, 2016, 6 pages.
"Second Written Opinion", Application No. PCT/US2015/035219, dated Apr. 26, 2016, 8 pages.
"Second Written Opinion", Application No. PCT/US2015/036587, dated May 18, 2016, 7 pages.
"Second Written Opinion", Application No. PCT/US2015/036859, dated May 6, 2016, 7 pages.
"Step by Step Microsoft Word 2013", Available at: https://dbgyan.files.wordpress.com/2013/02/0735669120_wor.pdf, Mar. 1, 2013, 576 pages.
"Supplemental Notice of Allowance", U.S. Appl. No. 14/275,724, dated May 26, 2016, 2 pages.
"Supplemental Notice of Allowance", U.S. Appl. No. 14/275,761, dated May 12, 2016, 2 pages.
"Supplemental Notice of Allowance", U.S. Appl. No. 14/275,761, dated Jun. 8, 2016, 2 pages.
"Supplemental Notice of Allowance", U.S. Appl. No. 14/304,174, dated Apr. 26, 2016, 4 pages.
"Supplemental Notice of Allowance", U.S. Appl. No. 14/312,562, dated Apr. 28, 2016, 2 pages.
"The Ribbon Bar", Available at: http://bioinf.scri.ac.uk/tablet/help/ribbon.shtml, Dec. 1, 2012, 36 pages.
Gajos,"Automatically Generating Personalized User Interfaces with Supple", In Proceedings of Artificial Intelligence, vol. 174, Issue, Aug. 1, 2010, 49 pages.
Gajos,"Exploring the Design Space for Adaptive Graphical User Interfaces", In Proceedings of the Working Conference on Advanced Visual Interfaces, May 6, 2006, 8 pages.
Liu,"Language Model Combination and Adaptation using Weighted Finite State Transducers", In Proceedings of IEEE International Conference on Acoustics Speech and Signal Processing, Mar. 14, 2010, 4 pages.
Peng,"Joint and Implicit Registration for Face Recognition", Proceedings of the IEEE Computer Society Conference on Computer Vision and Pattern Recognition (CVPR'09), Jun. 2009, 8 pages.

Scarr,"Improving Command Selection with Command Maps", In Proceedings of the SIGCHI Conference on Human Factors in Computing Systems, May 2012, 10 pages.
"Final Office Action", U.S. Appl. No. 12/573,157, dated Feb. 17, 2015, 18 pages.
"Final Office Action", U.S. Appl. No. 12/573,157, dated Jul. 5, 2013, 18 pages.
"Final Office Action", U.S. Appl. No. 14/268,953, dated Sep. 14, 2016, 16 pages.
"Final Office Action", U.S. Appl. No. 14/316,802, dated Sep. 6, 2016, 20 pages.
"International Preliminary Report on Patentability", Application No. PCT/US2015/036587, dated Sep. 12, 2016, 7 pages.
"International Preliminary Report on Patentability", Application No. PCT/US2015/035219, dated Jun. 23, 2016, 9 pages.
"International Search Report and Written Opinion", Application No. PCT/US2015/021921, dated Jul. 17, 2015, 11 pages.
"International Search Report and Written Opinion", Application No. PCT/US2015/033633, dated Sep. 18, 2015, 11 pages.
"Non-Final Office Action", U.S. Appl. No. 12/573,157, dated Apr. 23, 2014, 19 pages.
"Non-Final Office Action", U.S. Appl. No. 12/573,157, dated Nov. 28, 2012, 11 pages.
"Non-Final Office Action", U.S. Appl. No. 14/264,619, dated Nov. 2, 2016, 10 pages.
"Notice of Allowance", U.S. Appl. No. 12/573,157, dated Jun. 6, 2016, 10 pages.
"Second Written Opinion", Application No. PCT/US2015/033633, dated Apr. 28, 2016, 7 pages.
Astheimer,"What you see is what you hear—Acoustics applied in Virtual Worlds", In Proceedings of IEEE Symposium on Research Frontiers in Virtual Reality, Oct. 25, 1993, pp. 100-107.
Funkhouser,"Survey of Methods for Modeling Sound Propagation in Interactive Virtual Environment Systems", Retrieved from <<http://www-sop.inria.fr/reves/Nicolas.Tsingos/publis/presence03.pdf, Jan. 2003, 53 pages.
Lauterbach,"Interactive Sound Rendering in Complex and Dynamic Scenes Using Frustum Tracing", In Proceedings of IEEE Transactions on Visualization and Computer Graphics (vol. 13, Issue 6), Nov. 2007, pp. 1672-1679.
Lentz,"Virtual Reality System with Integrated Sound Field Simulation and Reproduction", In EURASIP Journal on Applied Signal Processing, Issue 1, Jan. 2007, 22 pages.
Wand,"A Real-Time Sound Rendering Algorithm for Complex Scenes", Retrieved at: <<http://web.archive.org/web/20090605124135/http://www.mpi-de/~mwand/papers/tr03.pdf>>, Jul. 2003, 13 pages.
"International Preliminary Report on Patentability", Application No. PCT/US2015/031270, dated Aug. 17, 2016, 10 pages.
"Notice of Allowance", U.S. Appl. No. 14/227,492, dated Aug. 4, 2016, 11 pages.
"Non-Final Office Action", U.S. Appl. No. 14/266,795, dated Jul. 19, 2016, 12 pages.
"Non-Final Office Action", U.S. Appl. No. 14/529,636, dated Jul. 19, 2016, 12 pages.
"Final Office Action", U.S. Appl. No. 14/264,619, dated Aug. 12, 2016, 12 pages.
"Non-Final Office Action", U.S. Appl. No. 14/275,785, dated Sep. 9, 2016, 14 pages.
"Notice of Allowance", U.S. Appl. No. 14/265,110, dated Aug. 3, 2016, 22 pages.
"Final Office Action", U.S. Appl. No. 14/456,679, dated Aug. 31, 2016, 33 pages.
"Second Written Opinion", Application No. PCT/US2015/035218, dated Jul. 27, 2016, 7 pages.
"Notice of Allowance", U.S. Appl. No. 14/311,208, dated Jul. 19, 2016, 8 pages.
"International Preliminary Report on Patentability", Application No. PCT/US2015/026971, dated Aug. 10, 2016, 8 pages.
"Non-Final Office Action", U.S. Appl. No. 14/264,012, dated Aug. 10, 2016, 8 pages.
"International Preliminary Report on Patentability", Application No. PCT/US2015/032089, dated Jun. 29, 2016, 9 pages.

(56) References Cited

OTHER PUBLICATIONS

"Non-Final Office Action", U.S. Appl. No. 13/923,917, dated Jun. 30, 2016, 9 pages.
"International Preliminary Report on Patentability", Application No. PCT/US2015/027689, dated Jul. 18, 2016, 9 pages.
"First Action Interview Office Action", U.S. Appl. No. 14/444,987, dated Aug. 24, 2016, 9 pages.
"International Preliminary Report on Patentability", Application No. PCT/US2015/028383, dated Jul. 18, 2016, 10 pages.
"International Preliminary Report on Patentability", Application No. PCT/US2015/030113, dated Jul. 14, 2016, 11 Pages.
"International Preliminary Report on Patentability", Application No. PCT/US2015/029805, dated Jul. 27, 2016, 11 pages.
"International Preliminary Report on Patentability", Application No. PCT/US2015/033872, dated Jul. 1, 2016, 6 pages.
"International Preliminary Report on Patentability", Application No. PCT/US2015/030096, dated Jul. 14, 2016, 8 pages.
"International Preliminary Report on Patentability", Application No. PCT/US2015/029334, dated Jul. 18, 2016, 8 pages.
"International Preliminary Report on Patentability", Application No. PCT/US2015/027409, dated Jun. 16, 2016, 9 pages.
"Non-Final Office Action", U.S. Appl. No. 14/279,146, dated Aug. 3, 2016, 15 pages.
"Non-Final Office Action", U.S. Appl. No. 14/296,644, dated Aug. 4, 2016, 25 pages.
"Non-Final Office Action", U.S. Appl. No. 14/316,802, dated Jul. 8, 2016, 17 pages.
"Non-Final Office Action", U.S. Appl. No. 14/338,078, dated Jun. 16, 2016, 19 pages.
"Second Written Opinion", Application No. PCT/US2015/036595, dated May 31, 2016, 6 pages.
"Supplemental Notice of Allowance", U.S. Appl. No. 14/275,724, dated Jul. 6, 2016, 2 pages.
"Supplemental Notice of Allowance", U.S. Appl. No. 14/275,724, dated Aug. 3, 2016, 2 pages.
"Final Office Action", U.S. Appl. No. 14/268,953, dated Jun. 6, 2017, 18 pages.
"Final Office Action", U.S. Appl. No. 14/275,785, dated Apr. 24, 2017, 16 pages.
"Non-Final Office Action", U.S. Appl. No. 14/266,795, dated Jun. 16, 2017, 15 pages.
"Non-Final Office Action", U.S. Appl. No. 14/296,644, dated Jun. 14, 2017, 44 pages.
"Non-Final Office Action", U.S. Appl. No. 15/259,396, dated Apr. 7, 2017, 7 pages.
"Notice of Allowance", U.S. Appl. No. 13/920,323, dated Apr. 3, 2017, 8 pages.
"Notice of Allowance", U.S. Appl. No. 14/264,619, dated May 10, 2017, 6 pages.
"Notice of Allowance", U.S. Appl. No. 14/316,802, dated Apr. 20, 2017, 8 pages.
"Restriction Requirement", U.S. Appl. No. 14/294,410, dated Jun. 2, 2017, 5 pages.
"Final Office Action", U.S. Appl. No. 13/920,323, dated Nov. 18, 2016, 24 pages.
"Final Office Action", U.S. Appl. No. 14/266,7995, dated Jan. 17, 2017, 11 pages.
"Final Office Action", U.S. Appl. No. 14/296,644, dated Jan. 12, 2017, 30 pages.
"Final Office Action", U.S. Appl. No. 14/338,078, dated Dec. 30, 2016, 32 pages.
"Final Office Action", U.S. Appl. No. 14/529,636, dated Jan. 31, 2017, 15 pages.
"Final Office Action", U.S. Appl. No. 15/076,125, dated Dec. 8, 2016, 6 pages.
"International Preliminary Report on Patentability", Application No. PCT/US2015/033950, dated Dec. 15, 2016, 14 pages.
"International Preliminary Report on Patentability", Application No. PCT/US2015/036595, dated Oct. 7, 2016, 8 pages.
"International Preliminary Report on Patentability", Application No. PCT/US2015/036859, dated Oct. 7, 2016, 8 pages.
"International Preliminary Report on Patentability", Application No. PCT/US2015/033545, dated Dec. 15, 2016, 8 pages.
"Non-Final Office Action", U.S. Appl. No. 14/268,953, dated Jan. 26, 2017, 15 pages.
"Non-Final Office Action", U.S. Appl. No. 14/273,100, dated Jan. 30, 2017, 14 pages.
"Non-Final Office Action", U.S. Appl. No. 14/316,802, dated Dec. 2, 2016, 22 pages.
"Notice of Allowance", U.S. Appl. No. 14/264,012, dated Jan. 5, 2017, 8 pages.
"Notice of Allowance", U.S. Appl. No. 14/264,619, dated Mar. 1, 2017, 6 pages.
"Notice of Allowance", U.S. Appl. No. 14/312,501, dated Feb. 15, 2017, 8 pages.
"Notice of Allowance", U.S. Appl. No. 14/444,987, dated Mar. 15, 2017, 8 pages.
"Notice of Allowance", U.S. Appl. No. 14/456,679, dated Nov. 30, 2016, 15 pages.
"Notice of Allowance", U.S. Appl. No. 15/076,125, dated Feb. 21, 2017, 5 pages.
"Notice of Allowance", U.S. Appl. No. 4/456,679, dated Nov. 30, 2016, 15 pages.
"Corrected Notice of Allowance", U.S. Appl. No. 14/275,785, dated Oct. 5, 2017, 2 pages.
"Final Office Action", U.S. Appl. No. 14/273,100, dated Oct. 2, 2017, 16 pages.
"Non-Final Office Action", U.S. Appl. No. 14/268,953, dated Sep. 18, 2017, 21 pages.
"Non-Final Office Action", U.S. Appl. No. 14/294,410, dated Sep. 21, 2017, 7 pages.
"Notice of Allowance", U.S. Appl. No. 14/275,785, dated Sep. 27, 2017, 17 pages.
"Notice of Allowance", U.S. Appl. No. 14/529,636, dated Sep. 21, 2017, 7 pages.
"Notice of Allowance", U.S. Appl. No. 15/140,315, dated Oct. 20, 2017, 9 pages.
"Non-Final Office Action", U.S. Appl. No. 15/140,315, dated Aug. 7, 2017, 12 pages.
"Final Office Action", U.S. Appl. No. 15/259,396, dated Aug. 30, 2017, 7 pages.

* cited by examiner

POWER MANAGEMENT CONTRACTS FOR ACCESSORY DEVICES

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

One challenge that faces developers of mobile computing devices is efficient power management and battery life. For instance, a host computing device and supported accessories may have limited availability of power from internal power supplies. In some scenarios, a device may obtain supplemental power from other devices and/or an external power source (e.g., an external battery). However, traditional power management schemes may set fixed constraints upon the manner in which devices exchange power. As such, changes that may occur in operating conditions may not be properly accounted for, and this may result in inefficient power utilization.

Power management contracts for accessory devices are described. In one or more implementations, a power management contract is established for a system including a host computing device and an accessory device based at least in part upon power exchange conditions observed for the system. The power management contracts define operating constraints for power exchange between components of the system, including at least a power exchange direction and current limits. The host computing device and accessory devices are each configured to renegotiate the power management contract to dynamically change operating constraints in "real-time." Additionally, different power management contracts may be associated with identifying data corresponding to different types of accessory devices.

Upon connection of an accessory device to the host computing device, data indicative of the identity is obtained and used to verify whether the accessory device is an authorized accessory. Interaction with the accessory device may be restricted if the accessory device is not authorized. When the accessory device is an authorized accessory, however, the data indicative of the identity may be used to look-up power contract settings associated with the accessory device and set a power exchange direction, current limits, and/or other operating constraints accordingly. When either the host or accessory detects a change in power exchange conditions that necessitate an update to the power management contract, power contract update messages are communicated between the host and accessory to effectuate a real-time update to the power exchange operating constraints and thereby activate an updated power contract.

In the following discussion, an example environment and devices are first described that may employ the techniques described herein. Example details and procedures are then described which may be performed in the example environment and by the devices as well as in other environments and by other devices. Consequently, implementation of the example details and procedures is not limited to the example environment/devices and the example environment/devices are not limited to the example details and procedures.

Example Operating Environment

Figure 1:
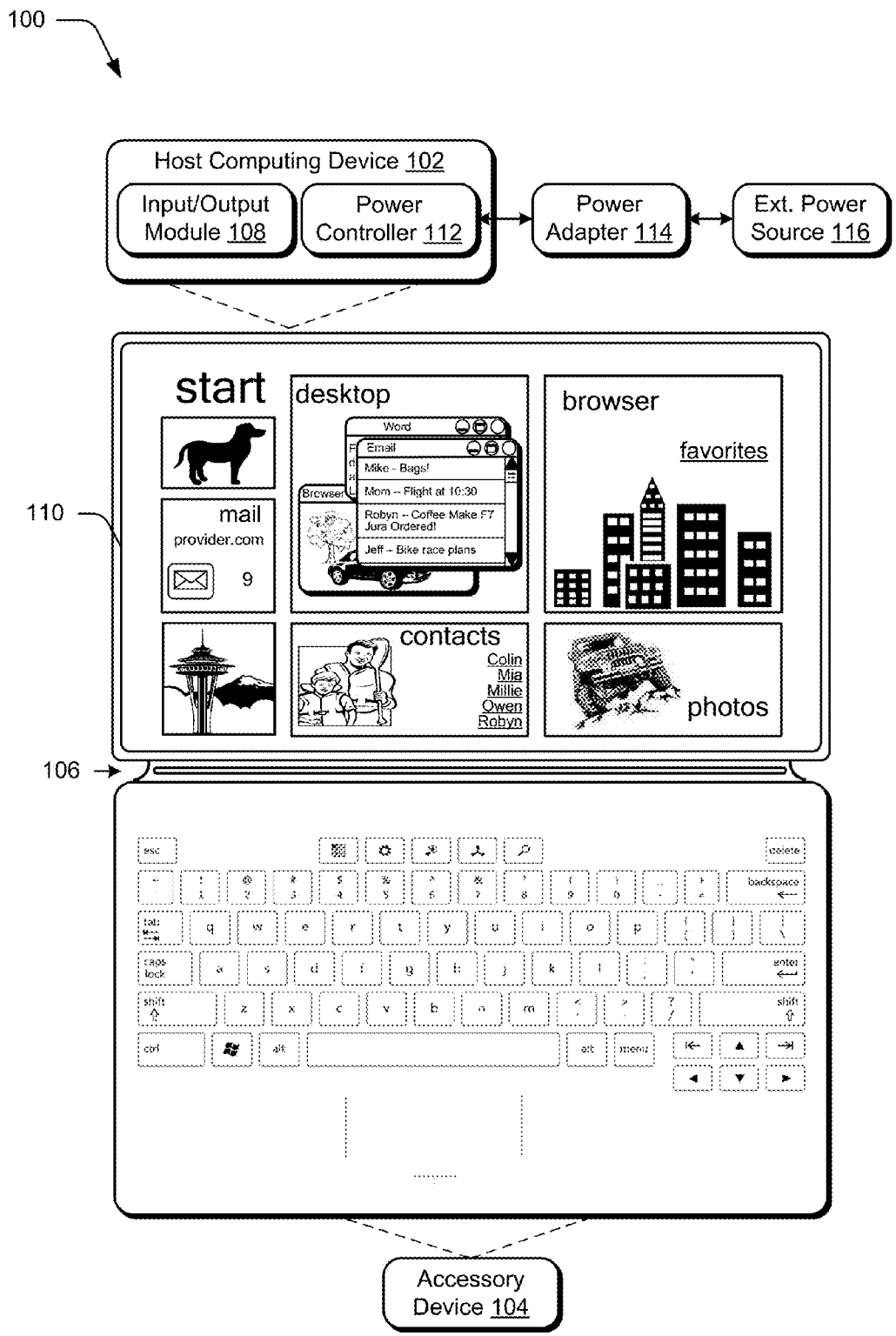
FIG. 1 is an illustration of an environment in an example implementation that is operable to employ the techniques described herein.

FIG. 1 is an illustration of an environment 100 in an example implementation that is operable to employ the techniques described herein. The illustrated environment 100 includes an example of a host computing device 102 that is physically and communicatively coupled to an accessory device 104 via an interface 106. The host computing device 102 may be configured in a variety of ways. For example, the computing device 102 may be configured for mobile use, such as a mobile phone, a wearable device, a tablet computer as illustrated, and so on. Thus, the host computing device 102 may range from full resource devices with substantial memory and processor resources to a low-resource device with limited memory and/or processing resources. The host computing device 102 may also relate to software that causes the host computing device 102 to perform one or more operations.

The host computing device 102, for instance, is illustrated as including an input/output module 108. The input/output module 108 is representative of functionality relating to processing of inputs and rendering outputs of the host computing device 102. A variety of different inputs may be processed by the input/output module 108, such as inputs relating to functions that correspond to keys of the input device, keys of a virtual keyboard displayed by the display device 110 to identify gestures and cause operations to be performed that correspond to the gestures that may be recognized through the accessory device 104 and/or touchscreen functionality of the display device 110, and so forth. Thus, the input/output module 108 may support a variety of different input techniques by recognizing and leveraging a division between types of inputs including key presses, gestures, and so on.

In the illustrated example, the accessory device 104 is a device configured as a keyboard having a QWERTY arrangement of keys although other arrangements of keys are also contemplated. Further, other non-conventional configurations for an accessory device 104 are also contemplated, such as a game controller, configuration to mimic a musical instrument, a power adapter, a docking station, a USB hub, an external battery, combinations of these configurations, and so forth. Thus, the accessory device 104 may assume a variety of different configurations to support a variety of different functionality. Different accessory devices may be removably connected to the computing device at different times.

As previously described, the accessory device 104 is physically and communicatively coupled to the host computing device 102 in this example through an interface 106 in the form of a flexible hinge. The flexible hinge 106 represents but one illustrative example of an interface 106 that is suitable to connect and/or attach an accessory device to a host computing device 102. The flexible hinge, for instance, may be formed using one or more layers of fabric and include conductors formed as flexible traces to communicatively couple the accessory device 104 to the host computing device 102 and vice versa. The flexible hinge is flexible in that rotational movement supported by the hinge is achieved through flexing (e.g., bending) of the material forming the hinge as opposed to mechanical rotation as supported by a pin, although that embodiment is also contemplated. By such rotational movement, the flexible hinge enables the accessory device 104 to assume a variety of positions relative to the host computing device 102 including but not limited a closed position in which the accessory may act as a cover, an open or typing position, and/or a tablet position in which the accessory is rotated to lay flat against a "back" side of the host computing device 102 (e.g., a side that opposes the illustrated "front" side having the display device 110.)

Other types of interfaces 106 and connectors are also contemplated such as uses of magnetic coupling devices, integrated communication ports and communication contacts, mechanical coupling protrusions, slots, and/or indentions, individually or in combination to form different types of interfaces 106. In one example, the interface 106 may be configured as a communication port configured to enable connection to accessory devices via a corresponding connector and/or connector cord. In at least some implementations, the interface 106 is configured to enable communications for authentication and control of the accessory device 104 as described herein. For example, the computing device 102 may receive credentials (e.g., data indicative of an identity of an accessory) and other data regarding capabilities of the accessory device through the interface responsive to detecting the presence/attachment of the accessory device 104. The interface may also provide a power coupling for exchange of power and communication of messages to implement and update power management contracts as described above and below.

As further illustrated in FIG. 1 the computing device 102 may include a power controller 112 configured to implement aspects of power management contract techniques described herein. In particular, the power controller 112 represents functionality to perform various operations for power management including handling settings for power management operating constraints defined by power management contracts, selectively activating contracts based on accessory identities, facilitating exchange of power management messages between the host and accessories, and updating power management contracts dynamically in response to changes in observed conditions. Power management implemented by the power controller 112 may also include management of different power sources and switching between the sources, implementing a defined and/or selected power management scheme, managing battery life, and so forth. The power controller 112 may further facilitate connections and communications with a power adapter 114 (also referred to herein as a power supply unit (PSU)) configured to supply power to the device via a suitable external power source 116, such as a wall socket, external battery, power supply unit, or other of power source. The power controller 112 may also be operable to supply power to accessory devices in appropriate circumstances. In other words, the power controller 112 may manage power operations jointly for a host computing device and authorized accessory devices including power exchange between the host computing device and an accessory device.

The power controller 112 may be implemented in hardware, software, firmware and/or combinations thereof. By way of example and not limitation, the computing device 102 may include a microcontroller or other suitable hardware logic device configured to implement various functionally that is described herein in relation to power controller 112. The power controller 112 may therefore represent firmware or logic associated with a suitable hardware logic device. In addition or alternatively, the power controller 112 may be implemented by way of a processing system of the device and one or more program modules that are executable/operable via the processing system.

The power adapter 114 may be configured to selectively operate in multiple modes and supply multiple power levels to the computing device. The level of power supplied at a particular time may be based upon input, notifications, or other suitable feedback configured and sent to the power adapter 114 by the power controller 112 to cause the power adapter 114 to supply a corresponding level of power. Depending upon a power exchange state, the power adapter 114, when connected to the computing device, may charge a battery associated with one or both of the host and accessory, supply power to support operations of one or both the host and accessory, and otherwise supply power from external power sources 116 for joint charging and operation of the host and accessory in various combinations. Power management contracts implemented via the power controller 112 may be configured to control flow of power between system components (e.g., host, accessory, and adapter) in dependence upon accessory identity, power exchange conditions, power source availability, and so forth. Further details regarding operation of the power controller 112 and the power adapter 114 to implement power management contracts for accessory devices can be found in the following discussion.

Example Power Management Contract Details

Figure 2:
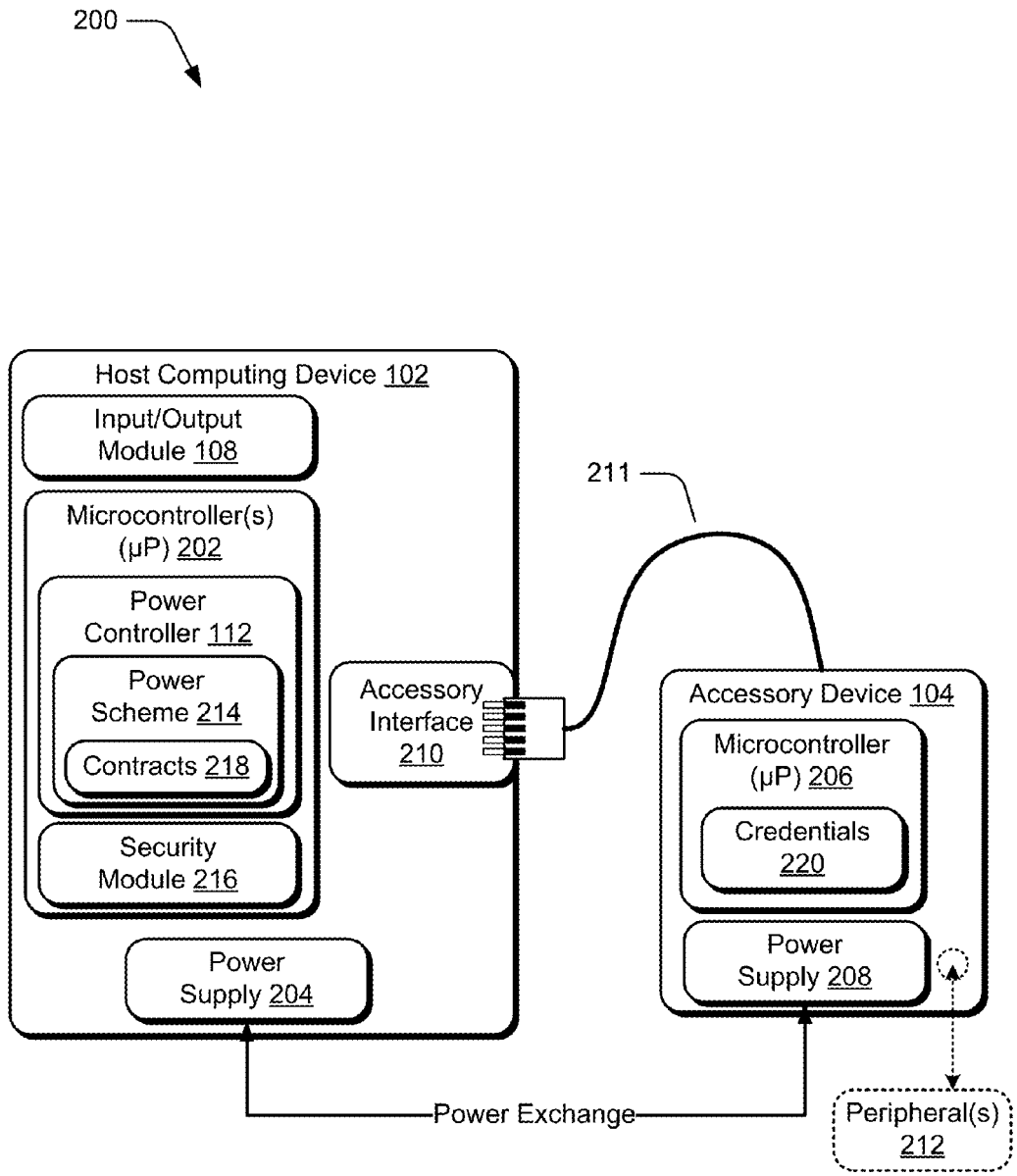
FIG. 2 depicts an example computing device and accessory device of FIG. 1 in greater detail.

FIG. 2 depicts generally at 200 an example host computing device 102 and accessory device 104 in greater detail. In FIG.2, the host computing device 102 is depicted as having a power controller 112 is illustrated as being provided by one or more microcontroller(s) 202, also referred to as microprocessing unit(s) (µP ). The computing device 102 further includes an associated power supply 204, such as one or more internal batteries. The accessory device 104 may also include one or more microcontroller(s) 206 and a respective power supply 208. The power supply 208 may be configured as one or more batteries that are internal to the accessory device 104 (e.g., an accessory battery) and may therefore be considered external batteries with respect to the host computing device 102.

The example microcontrollers (µPs) represent hardware devices/systems that are designed to perform a predefined set of designated tasks. Microcontrollers may represent respective on-chip systems/circuits having self-contained resources such as processing components, I/O devices/peripherals, various types of memory (ROM, RAM, Flash, EEPROM), programmable logic, and so forth. Different microcontrollers may be configured to implement embedded applications/functionality that are implemented at least partially in hardware and perform corresponding tasks. In particular, the example microcontrollers 202, 206 enable performance of tasks for device authentication and power management outside of operation of a general purpose processing system and other applications/components of the computing device or accessory device. Generally, power consumption of the microcontrollers is low in comparison with operating a general purpose processing system for a device.

Accordingly, components implemented via microcontrollers may operate using relatively low power, independently of operating a "primary" processing system of a host computing device, and/or without booting/executing an operating system or using other device components and applications. In other words, the microcontrollers may operate to perform some power management tasks in a low power mode without having to operate or supply power to the processing system and other device components (e.g., device memory, network interface, display device, etc.) and/or without completely starting-up or waking-up the computing device.

The host computing device 202 may be connectable to different accessory devices via an accessory interface 210. The accessory interface 210 is representative of functionality to achieve a physical and communicative coupling between the host computing device and various accessories. For example, a connector 211 corresponding to the accessory interface 210 may be employed to connect accessories to the host computing and enable exchange of control signals, data, and power. In the depicted example, the connector 211 is illustrated as a connector cord that may be removably inserted into a corresponding port associated with the accessory interface 210, although other types of connections are also contemplated, such as the flexible hinge discussed in relation to FIG. 1, connections to a docking station discussed in relation to the following figure, and/or another suitable interfaces and connector combinations. Alternatively, wireless communications may be employed between accessory and host devices. In that alternative example, host and accessory devices may communicate contracts for wireless power exchange, for example, power exchanged via inductive power coupling.

As represented in FIG. 2, power exchange may occur between the power supply 204 of the host and the power supply 208 of the accessory in accordance with techniques described above and below. In some implementations, power exchange may also occur with an external power source 116 configured as an external battery via a power adapter 114 as represented in FIG. 1. In other words, three-way power exchange may occur between batteries/power supplies corresponding to the host, an accessory connected via the accessory interface, and an external power source. Generally, power exchange between the host and one or more connected devices (adapters/accessories/peripherals) may occur back and forth (e.g., bi-directionally) from the host to one or more of the devices, from one or more of the devices to the host, and/or directly between connected devices (e.g., device to device) through the host.

Thus, power exchange may occur via the accessory interface 210 in some scenarios. Power supplied to the host computing device may be used to operate the host (e.g., service the system load) and/or to maintain a charge level of the power supply 204 (e.g., internal battery). Additionally, power supplied to the host may be supplied directly or indirectly to the accessory device 104 to support operations and/or charge the power supply 208 (e.g., external battery). Moreover, power may be distributed from the host computing device 102 and/or the accessory device 104 to one or more peripherals 212 that may be connected directly to the host computing device and/or connected to the system through the accessory device 104 as represented in FIG. 2. For example, in one or more implementations an accessory device may be configured to provide functionality of a peripheral device hub, such as a hub that provides multiple universal serial bus (USB) ports and/or other types of connection ports to which a variety of peripherals 212 may be connected. The peripherals 212 may include various devices, such as a peripheral display device, a printer, a scanner, audio devices, a camera, a storage device, or a network adapter, to name a few examples.

It should be noted that the host computing device 102 and accessory device 104 may both be configured to employ external power sources 116, such as through the use of respective power adapters 114 connected to a wall socket or another source. Power supplied directly to the accessory device 104 via a respective power adapter 114 may be used, shared, and/or exchanged between the host and accessory in a manner comparable to power that is supplied directly to the host computing device 102.

The host computing device may be further configured to implement a power scheme 214 and a security module 216 in various ways. In the illustrated example, the power scheme 214 is depicted as being implemented via the power controller 112. In this example, the power scheme 214 is configured as firmware associated with the host computing device 102. For example, the power scheme 214 may represent firmware associated with a microcontroller 202, power controller 112, or other suitable hardware logic device. Alternatively, the power scheme 214 may be implemented as a standalone module using any suitable combination of hardware, software, firmware, and/or logic devices.

The power scheme 214 represents functionality to implement power management contract techniques described above and below as well as other power management functions. In particular, the power scheme 214 may be configured to jointly manage power flow between a power adapter 114, host computing device 102, and accessory device 104. By way of example and not limitation, this may include controlling power flow to selectively charge batteries associated with the components; exchange power between the batteries, processing systems, and components; supply power to service the system load for the host and accessory; and so forth. In order to do so, the power scheme 214 may provide functionality to establish, enforce, and update power management contracts 218 between various components of the system. This functionality may include support for sending and receiving messages regarding power management contracts between system components. As noted, the power management contracts 218 are configured to define operating constraints for power management including but not limited to specifying power exchange direction and current limits for different devices and scenarios. Moreover, the settings for power management contracts 218 may be modified in real-time based on conditions observed by the host or accessory. Thus, initial or default settings for a power management contracts 218 may be associated with different accessories and appropriate contracts may be activated upon initial connection and authorization of the different accessories. The initially activated power management contracts 218 may be modified thereafter based upon conditions including but not limited to relative states of charge (RSOC) for batteries of the system components, power loads being serviced, a number of peripherals 212 connected to the host and/or accessory, power source availability for system components, power supply characteristics, processing loads, and so forth. Thus, rather than fixing operating constraints for power exchange at the time accessories and/or peripherals are connected to the system, the power management contracts 218 and associated techniques discussed herein are designed to enable dynamic adjustments to such constraints in response to changing conditions at any time during connection of an accessory to a host. Such modifications of initial settings for a power management contract 218 based on "real-time" conditions may be initiated by accessory devices and/or by the host computing device.

The security module 216 represents functionality operable to identify and/or authenticate accessory devices when the devices are attached/connected to the computing devices. The security module 216 may be configured to implement a variety of different authentication techniques. Generally speaking, the security module 216 performs an authentication sequence in which credentials 220 (e.g., device ID/password, alphanumeric code, an identifying resistor value, etc.) associated with an accessory device 104 are obtained and verified. The accessory device 104 in FIG. 2 is illustrated as including example credentials 220, which may be provided to the security module 216 for authentication upon request.

If the credentials are valid (e.g., the device is a recognized device that has associated privileges), the authentication is considered successful and the accessory device 104 may be authorized for power exchange through the power controller 112 and other interaction with the host computing device 102. Moreover, the credentials 220 may be associated with power management contract settings maintained for authorized device and therefore may be used to look-up and activate such settings (e.g., initial or default settings) for different devices upon successful authentication. On the other hand, if the credentials are not valid, interaction of the accessory device 104 with the computing device 102 may be restricted in various ways and/or prevented. Thus, the security module 216 may prevent unauthorized devices from supplying/using power in ways that may be inefficient and/or unsafe.

Figure 3A:
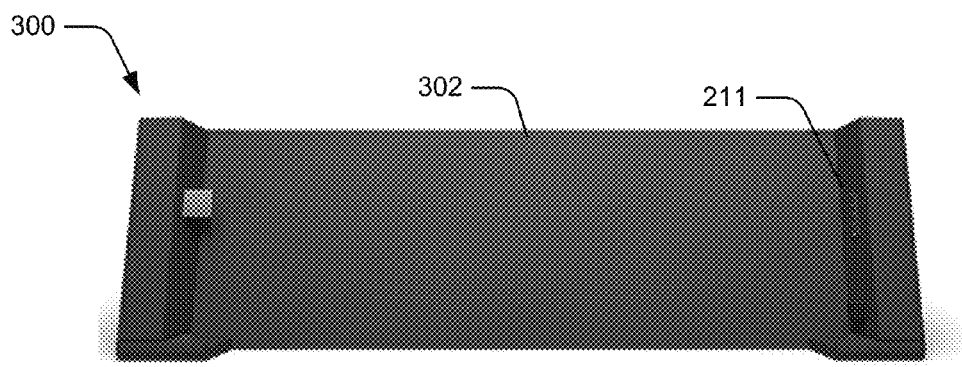
FIG. 3A depicts an example view of an accessory device configured as a docking station in accordance with one or more implementations.
Figure 3B:
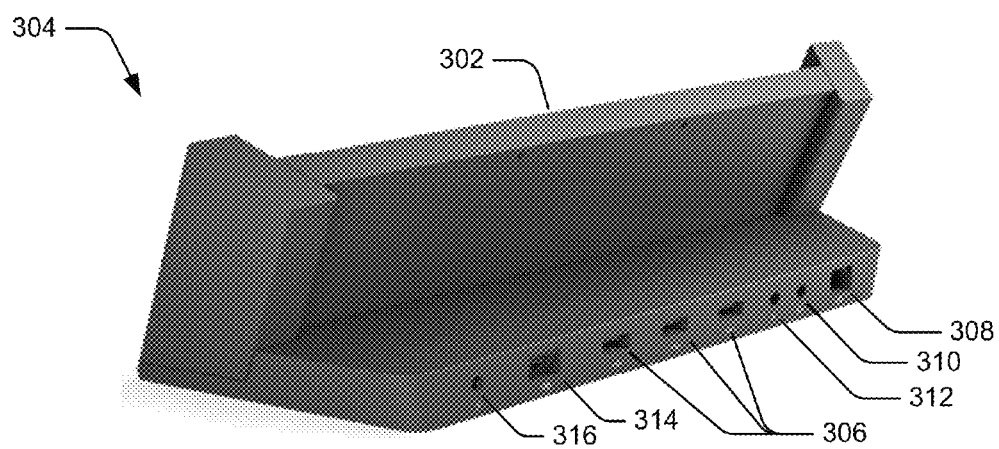
FIG. 3B depicts an example perspective view of the docking station of FIG. 3A to illustrate representative ports on a back side of the device in accordance with one or more implementations.
Figure 3C:
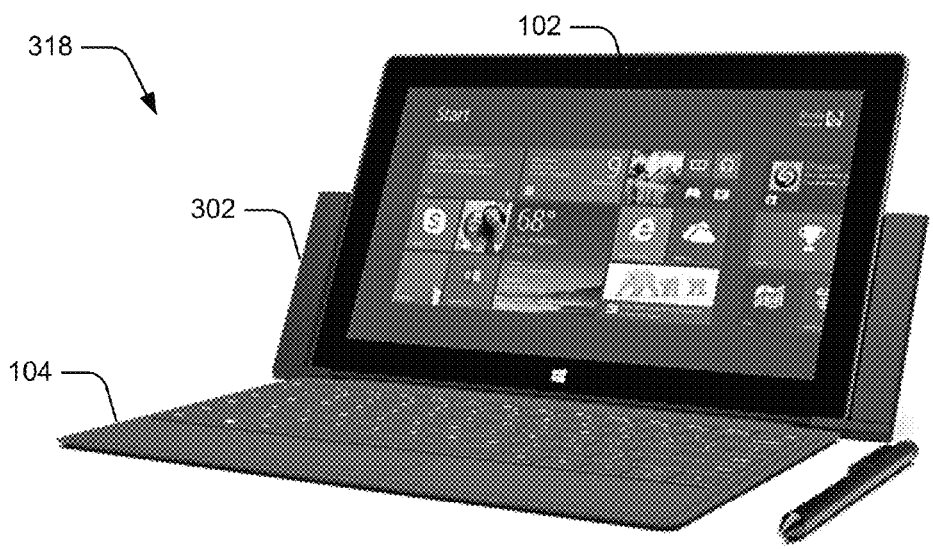
FIG. 3C depicts an example view of a system that includes the docking station of FIGS. 3A and 3B and a host computing device shown as being inserted in and connected to the docking station.

As mentioned, the power management contract techniques discussed herein may be employed with accessory devices configured to provide functionality of a peripheral device hub, such as a standalone hub, a docking station, a monitor that incorporates a peripheral device hub, and so forth. Such accessory devices may include ports and connectors for various kinds of device including but not limited to USB, parallel interface connections, serial interface connections, firewire, PS/2, HDMI, and other types of ports and connection mechanisms. By way of example and not limitation, FIGS. 3A to 3C illustrate one particular example of an accessory device in the form of a docking station that integrates a peripheral device hub. In particular, FIG. 3A depicts an example view 300 of an accessory device configured as a docking station 302 in accordance with one or more implementations. In this example, the docking station 302 is configured to receive and connect to a host computing device 102 having a slate form factor (e.g., a tablet). The docking station 302 may include one or more connectors 211 designed to create a communicative and physical coupling to an accessory interface 210 of a host computing device 102.

Here, the slate form device may be slidably and removably received into the docking station 302. When inserted into the docking station 302, a power controller 112 of the slate device may implement a power scheme 214 and power management contracts 218 to jointly manage power (e.g., for a host, accessory, adapter, and/or peripherals of an interconnected system) in the manner discussed herein.

FIG. 3B depicts an example perspective view 304 of the docking station 302 of FIG. 3A to illustrate representative ports on a back side of the device in accordance with one or more implementations. By way of example and not limitation, the example docking station 302 includes a plurality of USB ports 308 that may operate as a USB hub, a Ethernet port 308, an audio out port 310 (e.g., for speakers or headphones), an audio in port 312 (e.g., for a microphone or auxiliary audio), a power adapter port 314, and a display port 316 for connection of a peripheral display device. The USB ports 308 as well as other ports may be configured to provide power to connected peripheral devices. As such, the ability of the docking station 302 to exchange power with the host may vary based upon the number of peripheral devices connected to the dock and the power load at any given time. The power management contracts 218 described herein may therefore be utilized to vary operating constraints accordingly as the number of peripherals, peripheral load, and/or other power management conditions discussed herein change.

FIG. 3C depicts an example view 318 of a system that includes the docking station 302 of FIGS. 3A and 3B and a host computing device 102 shown as being inserted in and connected to the docking station. In this example, the host computing device 102 is illustrated as being a slate form factor device (e.g., a tablet). The host computing device 102 is also shown as being connected to another accessory device 104 in the form of a keyboard that may be manipulable into various positions via an interface 106 (e.g., a flexible hinge) as discussed previously. In this arrangement, a power controller 112 may implement a power scheme 214 and power management contracts 218 to jointly manage power for interconnected components of the system in the manner discussed herein, including the keyboard connected to the host and any additional peripherals 212 that are connected to ports of the docking station.

Having considered the preceding discussion of an example operating environment, system, and devices, consider now a discussion of example procedures which includes further details regarding techniques to implement power management contracts for accessory devices.

Example Procedures

The following discussion describes techniques that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference may be made to the example operating environment 100 of FIG. 1 and the example devices of FIGS. 2-3C, respectively. Aspects of the procedures may be performed by a suitably configured computing device, such as the example host computing device 102 of FIG. 2 that includes or otherwise makes use of one or more microcontrollers 202 to implement power management contracts 218. In addition or alternatively, aspects of the procedures may be performed via an accessory device, such as the example accessory device 104 of FIG. 2 that includes or otherwise makes use of one or more microcontrollers 206.

Figure 4:
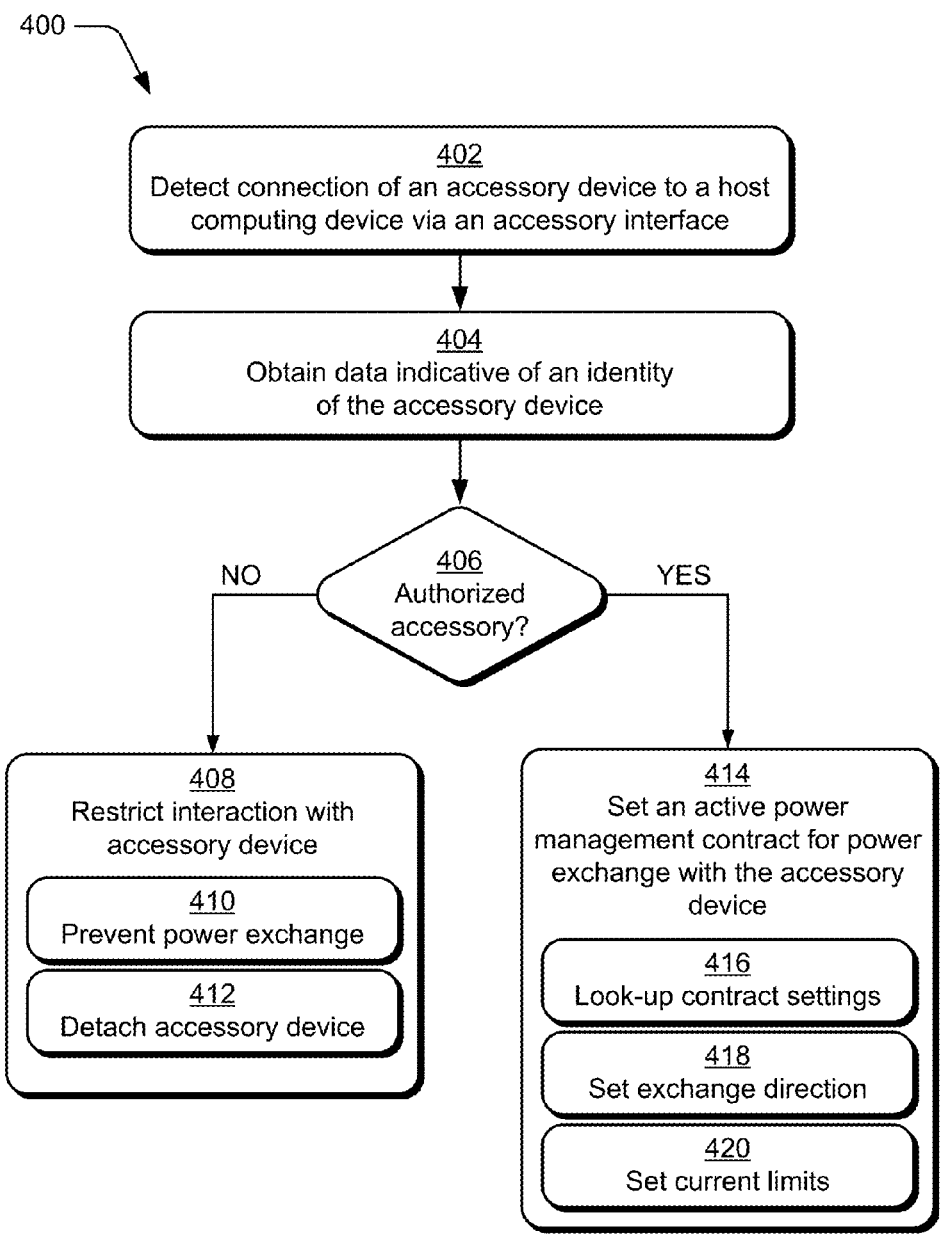
FIG. 4 depicts an example procedure in accordance with one or more implementations.

FIG. 4 depicts an example procedure 400 in which power exchange with an accessory device is controlled in accordance with a power management contract that is associated with the accessory. Connection is detected of an accessory device to a host computing device via an accessory interface (block 402). For example, one or more microcontrollers 202 associated with a host computing device 102 may be configured to recognize connection of various devices to an accessory interface 210. The detection may occur in various ways. In one approach, the one or more microcontrollers 202 are able to detect signals sent by an accessory device when a connector 211 is successfully attached to the accessory interface 210. Alternatively the host computing device 102 may be configured to poll the accessory interface 210 to determine when devices are attached or detached thereto.

After attachment of the accessory device, data indicative of an identity of the accessory device is obtained (block 404). For instance, accessory devices may be configured to supply credentials 220 to the host in various ways as mentioned previously. In one approach, accessory devices are configured to expose a respective resistor value indicative of the identity for reading by the host computing device. Different resistor values may be associated with different types of accessory. Thus, when an accessory is connected, the host computing device may read a corresponding resistor value and distinguish between different accessories on this basis. Alternatively, other credentials 220 may be communicated to the host by an accessory to indicate its identity, such as sending a particular numeric code, an ID field value, a device name, and so forth.

Based on the data indicative of the identity of the accessory device, a determination is made regarding whether the accessory device is an authorized device (block 406). For example, a resistor value or other obtained credential may be employed as a reference to look-up the particular values supplied in a table, list, or other data structure that reflects known values for authorized and/or un-authorized devices. In at least some implementations, the look-up may be performed by a security module 216 as described previously. Based on this look-up, the security module 216 is able to distinguish between authorized and un-authorized devices. The security module 216 may pass results of the authorization determination to a power controller 112 and/or other components to facilitate appropriate actions for power management.

In the event that the accessory device is not authorized, interaction with the accessory device may be restricted (block 408). Various restrictions may be placed on un-authorized devices by the power controller 112. For example, power exchange with the accessory device may be prevented (block 410). In addition or alternatively, the accessory device may be detached (block 412). These and other restrictions may be enforced by the power controller 112 to avoid power exchange and other interaction with "unknown" accessories that may be unsafe and/or lead to unexpected consequences.

On the other hand, in the event that the accessory device is authorized, an active power management contract may be set for power exchange with the accessory device (block 414). In order to do so, a look-up of settings for the power management contract is performed (block 416). Based on this look-up, the exchange direction is set (block 418) and one or more current limits are set (block 420). The settings for the active power management contract define operating constraints for power exchange between components of the systems. In particular, the power controller 112 may maintain a table, file, or other suitable data structure designed to associate authorized devices with corresponding power management contracts and settings for operating constraints. This data structure may reflect initial or default settings that may be activated upon connection of an authorized device. As noted the power management contracts may specify at least power exchange direction and one or more current limits. By way of example and not limitation, the power exchange direction may be indicated by a Boolean value (e.g., zero for "forward" power supply from a host to an accessory and one for "reverse" power supply from the accessory to the host.). The current limits may include either or both of a maximum current level or a minimum current level. Generally, the current limits may be represented by numerical values. A max current limit of zero may be set for an accessory device for example when the accessory is unable to supply power to the host. In this case, the power exchange direction may also be changed accordingly to zero. Alternatively, current limits for an accessory may be set to values that establish constraints on the amount of current the accessory is able to supply for operation and charging of the host under typical operating conditions. Likewise, current limits for exchange from the host to the accessory may be set to values that establish constraints on the amount of current the host is able to supply under typical operating conditions.

As noted, initial or default settings for power management contracts 218 applied at the time an accessory is connected may subsequently be dynamically altered in response to changing conditions. Thus, after setting up the active power management contract, monitoring may be performed to detect changes in conditions that necessitate updating of the settings. Details regarding techniques that may be employed to monitor conditions and dynamically alter settings for an active power management contract are discussed in relation to the following example procedure.

Figure 5:
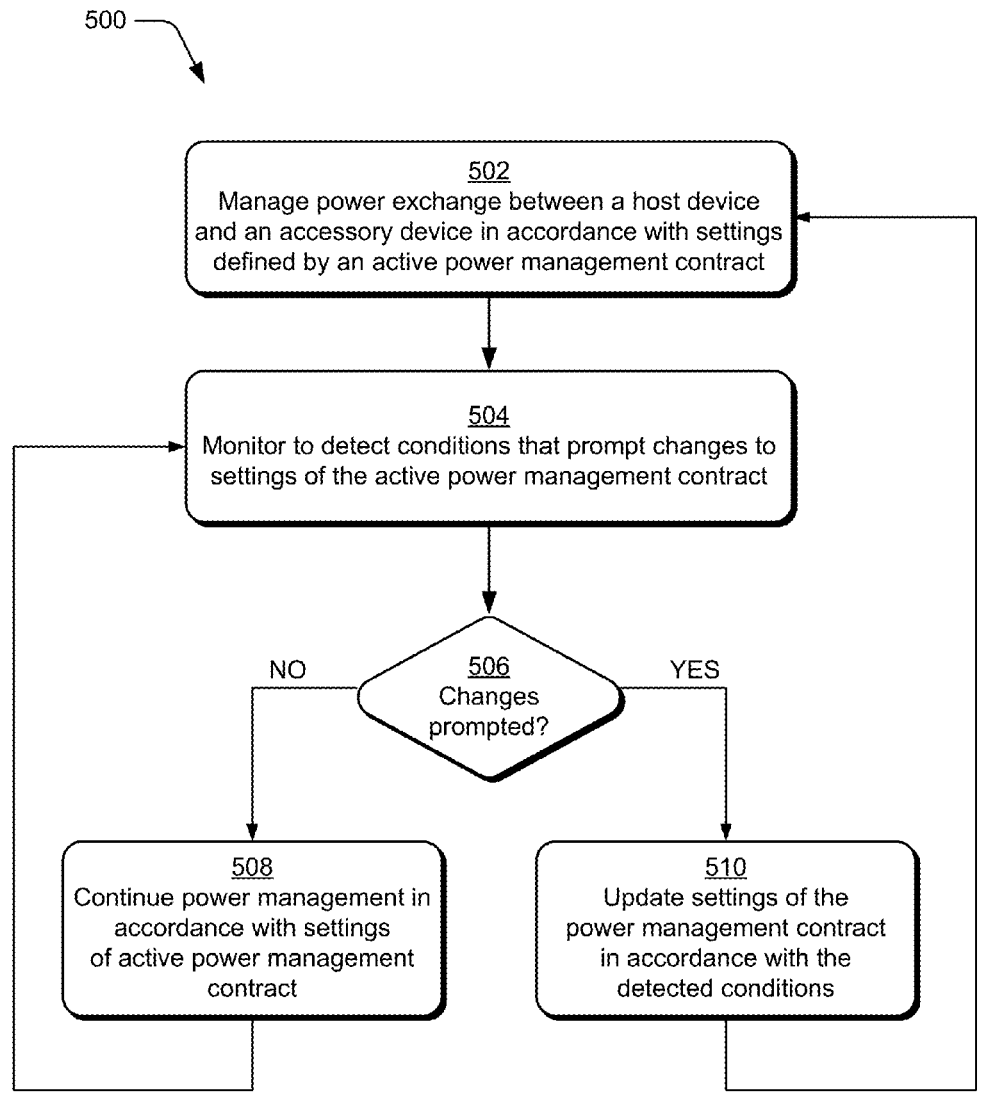
FIG. 5 depicts another example procedure in accordance with one or more implementations.

In particular, FIG. 5 depicts an example procedure 500 in which settings for an active power management contract are modified responsive to changes in power management conditions. Power exchange is managed between a host device and an accessory device in accordance with settings defined by an active power management contract (block 502). For example, a power management contract may be established and activated based on an identity of the accessory in the manner discussed in relation to the example procedure 400 of FIG. 4. The active power management contract may therefore represent initial settings associated with an accessory device. In addition or alternatively, the active power management contract may represent settings that have been modified in real-time based on an update to a previous state that was initiated based on observed conditions.

The active power management contract may be implemented by way of a power controller 112 as previously mentioned. The power controller may send notifications, directives, signal patterns, and/or other power contract update messages to a controller associated with an accessory device 104 (e.g., microcontroller 206) to communicate settings for the power management contract, request changes, approve changes, and otherwise direct the accessory device 104 to enforce a power scheme 214 and/or power management contract 218. For example, directives may be communicated by way of various power contract update messages to change power exchange direction, alter current limits (e.g., supply more or less power), and so forth. The accessory device 104 (e.g., by way of the microcontroller 206 or otherwise) may also be configured to generate and communicate comparable power contract update messages to negotiate power management contracts 218 with the host (e.g., the power controller). Power contract update messages may be configured in a variety of ways. For example, the messages may be configured as pulsed signal patterns that are recognizable by respective controllers of the host and accessory. Various suitable messaging protocols and corresponding message formats are also contemplated, such as using inter-integrated circuit (I²C) protocol, serial peripheral interface (SPI), universal asynchronous receiver/transmitter (UART) messaging, packet based communications, and object based messages, to name a few examples. Further, wireless messaging protocols such as near-field communication, Bluetooth, WiFi, RF protocols used in RFID, or cellular telecommunication protocols may be used.

To enable dynamic, "real-time" modification of power management constraints, monitoring is performed to detect conditions that prompt changes to settings of the active power management contract (block 504). For example, the power controller 112 may be configured to monitor various power management related conditions including but not limited to relative states of charge (RSOC) for batteries of the system components, power loads being serviced, a number of peripherals 212 connected to the host and/or accessory, power source availability for system components, power supply characteristics, processing loads, and so forth. The power controller 112 may be operable to monitor conditions of the host computing device 102 as well as conditions of connected accessory devices 106 and/or peripherals. In an implementation, system components may be configured to report conditions to the power controller 112 using power contract update messages as just described or other notification techniques.

Based on the monitoring, a determination is made regarding whether observed conditions prompt changes to the active power management contract (block 506). Changes may be prompted for example when peripherals are added or removed, additional power sources become available, load requirements change, and so forth. These and other changes in conditions may prompt corresponding changes in operating constraints. For example, if an external battery is connected to an accessory, this action may prompt a change in power exchange direction. In another example, addition of peripherals to the accessory may cause an increase in the load serviced by the accessory and therefore may cause a decrease in a limit placed on current that the accessory is able to deliver to the host. A variety of other examples are also contemplated.

Assuming that changes are not prompted per block 506, power management continues in accordance with the settings of the active power management contract (block 508) and further monitoring per block 504 may be performed. On the other hand, when changes are prompted per the determination of block 506, the settings of the power management contract are updated in accordance with the detected conditions (block 510). For example, the power controller 112 may be configured to modify data defining settings for a power management contract 218 in accordance with observed conditions, such as within a table or other data structure that associates power management contracts with accessory identities. Generally, the settings are temporarily overwritten such that initial or default settings may again be employed the next time an accessory of a given type is connected. However, in some scenarios the default settings may be overwritten in a persistent manner to effectively create new default settings. For example, new default settings may be created to account for a particular system configuration that is unlikely to be frequently changed, such as an arrangement of peripherals with a docking station. In one approach, a prompt may be output to request whether a user would like to retain or discard changes to the power management contract and the changes are then handled in accordance with a response to the request.

Following an update to settings for a contract, the procedure may return to block 502 where the updated power management contract is activated and power management is conducted in accordance with the updated settings. Monitoring per block 504 is again performed to detect any further changes. The example procedure 500 may be repeated again and again in the described manner until the system is shutdown, the host is disconnected from accessories, or other intervening events occur that cause the procedure to halt.

Figure 6:
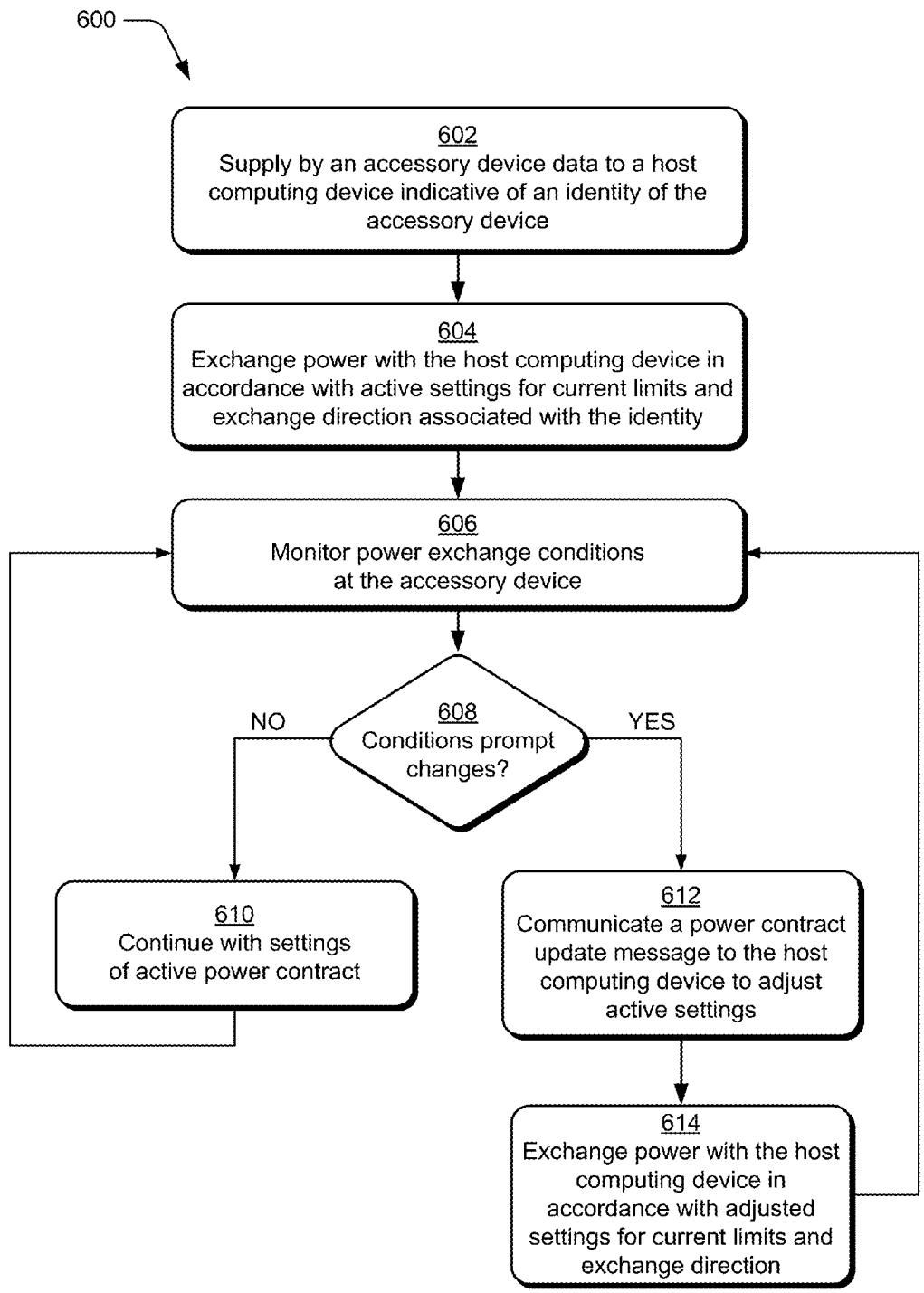
FIG. 6 depicts another example procedure in accordance with one or more implementations.

FIG. 6 depicts an example procedure 600 in which an accessory device initiates a contract change based on conditions observed at the accessory device. An accessory device supplies data to a host computing device indicative of an identity of the accessory device (block 602). For example, the accessory device may supply credentials to a host, expose a resistor value, or otherwise provide data that can be employed to resolve the identity of the accessory device (e.g., the type of device). The identifying data is suitable to enable a host to authorize the accessory device for power exchange or restrict the accessory as described previously. If the host does not recognize the identification information, and cannot resolve the identity of the accessory device, the host may prompt the user to provide information to the host so that the identity of the accessory device may be resolved. Alternatively, the host may automatically search a remote database, or send a query to a remote server, or a cloud-based service, to provide information that may be used to resolve the identity of the accessory device.

Assuming the accessory is authorized, power is exchanged with the host computing device in accordance with active settings for current limits and exchange direction associated with the identity (block 604). In other words, the accessory device may obtain power from the host or supply power to the host as indicated by the power exchange direction setting. Additionally, the power exchange occurs in accordance with the current limits set for exchange between the host and the particular accessory. Then, power exchange conditions are monitored at the accessory device (block 606). By so doing, the accessory device is able to initiate changes to the power contract on its own and/or negotiate changes to the power contract with the host. Generally, the accessory device monitors its own conditions and/or conditions for peripherals that are connected to the accessory. However, the accessory device may also be configured to perform monitoring of the host in some scenarios. Again various conditions may be monitored including but not limited to relative states of charge (RSOC) for batteries of the system components, power loads being serviced, a number of peripherals 212 connected to the host and/or accessory, power source availability for system components, power supply characteristics, processing loads, and so forth.

Based on the monitoring, a determination is made regarding whether observed conditions prompt changes to the power management contract (block 608). Assuming that changes are not prompted per block 608, power management continues in accordance with the settings of the active power management contract (block 610) and further monitoring per block 606 may be performed.

On the other hand, when changes are prompted per the determination of block 608, the accessory device may communicate a power contract update message to the host computing device to adjust the active settings (block 612). For example, a power contract update message may be sent from a microcontroller 206 of the accessory to the power controller 112 of the host to initiate a change in settings. The power contract update messages may be configured in the manner previously described in relation to FIG. 5. The power contract update messages may include at least an indication of the power exchange direction and current limits requested by the accessory device based on observed conditions. In response to the message, the power controller 112 may be configured to automatically apply the requested changes. Alternatively, the power controller 112 may be configured to selectively accept the request, deny the request, or provide alternative settings back to the accessory. Assuming the requested changes are accepted and/or applied, power is exchanged with the host computing device in accordance with adjusted settings for current limits and exchange direction (block 614). Thereafter, further monitoring per block 606 may occur to detect conditions that prompt additional changes. This cycle may be repeated as long as the accessory device remains connected to the host and the system is powered up. When the system is shutdown or the accessory is disconnected, the procedure may be discontinued.

Having considered the foregoing example procedures, consider now a discussion of example systems and devices that may be employed to implement aspects of power management contract techniques in one or more embodiments.

Example System and Device

Figure 7:
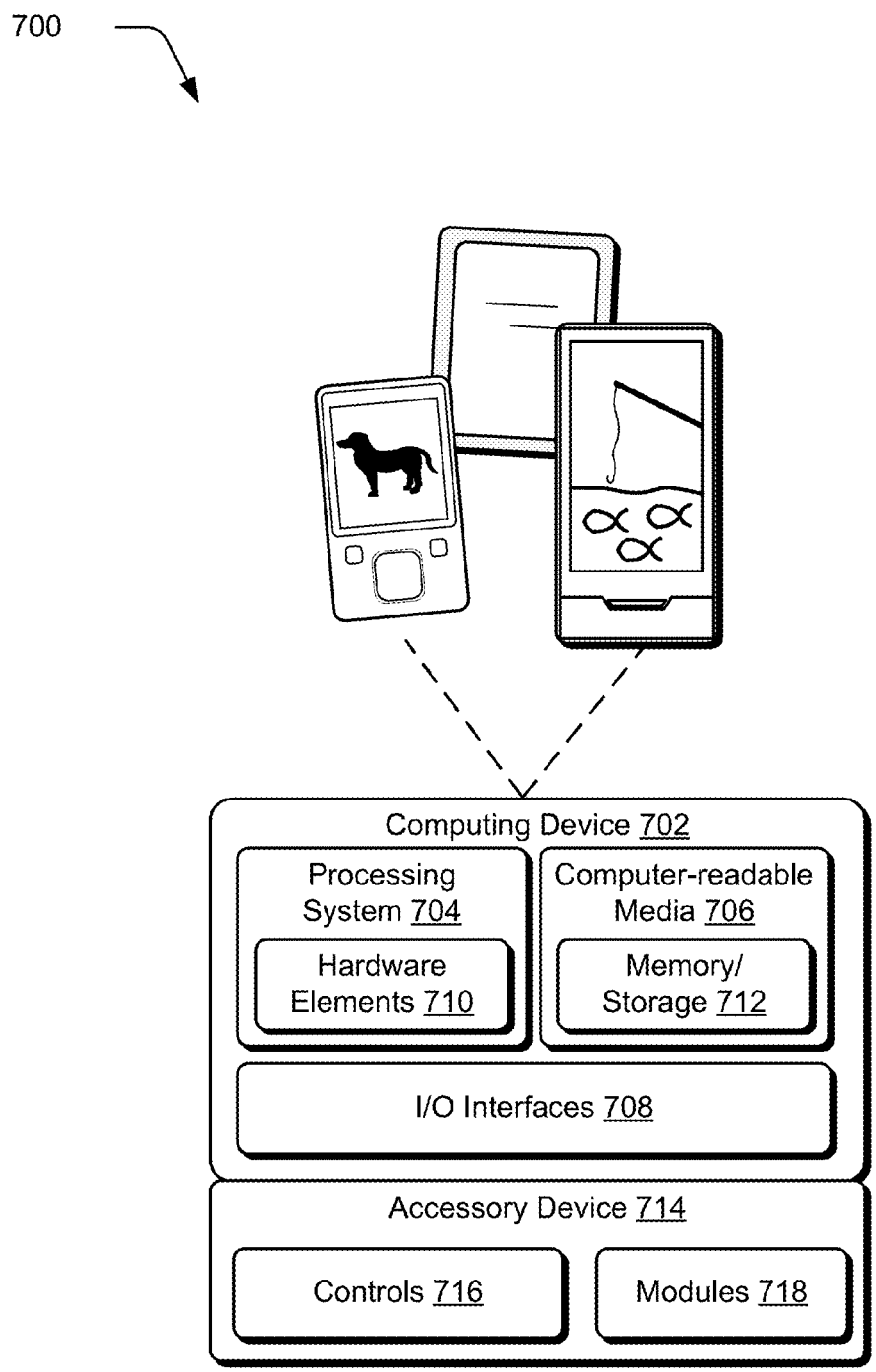
FIG. 7 illustrates an example system including various components of an example device that can be implemented as any type of computing device to implement embodiments of the techniques described herein.

FIG. 7 illustrates an example system generally at 700 that includes an example computing device 702 that is representative of one or more computing systems and/or devices that may implement the various techniques described herein. The computing device 702 may be, for example, be configured to assume a mobile configuration through use of a housing formed and size to be grasped and carried by one or more hands of a user, illustrated examples of which include a mobile phone, mobile game and music device, and tablet computer although other examples are also contemplated.

The example computing device 702 as illustrated includes a processing system 704, one or more computer-readable media 706, and one or more I/O interface 708 that are communicatively coupled, one to another. Although not shown, the computing device 702 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including hardware element 710 that may be configured as processors, functional blocks, and so forth. This may include implementation in hardware as an application specific integrated circuit or other logic device formed using one or more semiconductors. The hardware elements 710 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 706 is illustrated as including memory/storage 712. The memory/storage 712 represents memory/storage capacity associated with one or more computer-readable media. The memory/storage component 712 may include volatile media (such as random access memory (RAM)) and/or nonvolatile media (such as read only memory (ROM), Flash memory, optical disks, magnetic disks, and so forth). The memory/storage component 712 may include fixed media (e.g., RAM, ROM, a fixed hard drive, and so on) as well as removable media (e.g., Flash memory, a removable hard drive, an optical disc, and so forth). The computer-readable media 706 may be configured in a variety of other ways as further described below.

Input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 702 may be configured in a variety of ways to support user interaction.

The computing device 702 is further illustrated as being communicatively and physically coupled to an accessory device 714 that is physically and communicatively removable from the computing device 702. In this way, a variety of different input devices may be coupled to the computing device 702 having a wide variety of configurations to support a wide variety of functionality. In this example, the accessory device 714 includes one or more controls 716, which may be configured as press-sensitive keys, mechanically switched keys, buttons, and so forth.

The accessory device 714 is further illustrated as include one or more modules 718 that may be configured to support a variety of functionality. The one or more modules 718, for instance, may be configured to process analog and/or digital signals received from the controls 716 to determine whether an input was intended, determine whether an input is indicative of resting pressure, support authentication of the accessory device 714 for operation with the computing device 702, and so on.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 702. By way of example, and not limitation, computer-readable media may include "computer-readable storage media" and "computer-readable signal media."

"Computer-readable storage media" refers to media and/or devices that enable storage of information in contrast to mere signal transmission, carrier waves, or signals per se. Thus, computer-readable storage media does not include signals per se or signal-bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 702, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 710 and computer-readable media 706 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, microcontroller devices, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 710. The computing device 702 may be configured to implement particular instructions and/or functions corresponding to the software and/or hardware modules. Accordingly, implementation of a module that is executable by the computing device 702 as software may be achieved at least partially in hardware, e.g., through use of computer-readable storage media and/or hardware elements 710 of the processing system 704. The instructions and/or functions may be executable/operable by one or more articles of manufacture (for example, one or more computing devices 702 and/or processing systems 704) to implement techniques, modules, and examples described herein.

CONCLUSION

Although the example implementations have been described in language specific to structural features and/or methodological acts, it is to be understood that the implementations defined in the appended claims is not necessarily limited to the specific features or acts described. Rather, the specific features and acts are disclosed as example forms of implementing the claimed features.

What is claimed is:

1. A method implemented by a host computing device comprising:
   maintaining a data structure configured to associate authorized accessory devices with power contract settings for each authorized accessory device, the power contract settings including at least a power exchange direction and current limits;
   detecting connection of an accessory device to the host computing device via an accessory interface;
   determining whether the accessory device is an authorized accessory device by comparing identity data of the accessory device to known data that indicates respective identities of the authorized accessory devices;
   when the accessory device is determined as an authorized accessory device, setting an active power contract for power exchange between the host computing device and the authorized accessory device, including:
      obtaining, from the data structure, the power contract settings associated with the authorized accessory device; and
      setting active power contract settings for the authorized accessory device based on the power contract settings obtained from the data structure;
   monitoring power exchange conditions between the host computing device and the authorized accessory device;
   detecting a change in the power exchange conditions prompting modification of the active power contract settings including modifying the data structure to reflect the modified active power contract settings; and
   communicating an update message that includes the modified active power contract settings to the authorized accessory device.

2. A method as described in claim 1, further comprising monitoring the power exchange conditions at the authorized accessory device.

3. A method as described in claim 1, further comprising monitoring to detect receipt of update messages communicated by the authorized accessory device indicating a change in the power exchange conditions.

4. A method as described in claim 1, wherein the power exchange conditions at the authorized accessory device comprise power loads associated with one or more peripheral devices connected to the authorized accessory device.

5. A method as described in claim 1, further comprising:
   responsive to receiving a power contract update message communicated by the authorized accessory device, modifying the data structure to reflect settings indicated by the power contract update message.

6. A method as described in claim 1, further comprising updating the active power contract settings in accordance with the detected change in the power exchange conditions, the active power contract settings including the power exchange direction and the current limits.

7. A method as described in claim 1, further comprising: when the accessory device is not an authorized accessory device, restricting interaction with the accessory device.

8. A method as described in claim 1, wherein the accessory device comprises a docking station configured to facilitate connection of the host computing device to multiple peripheral devices.

9. A method as described in claim 1, wherein the identity data of the accessory device comprises credentials supplied by the accessory device and said determining whether the accessory device is the authorized accessory device comprises comparing the credentials against known credentials for accessory devices authorized to exchange power with the host computing device.

10. A method as described in claim 9, wherein the credentials supplied by the accessory device comprises a resistor value of a resistor associated with the accessory device.

11. A method as described in claim 10, wherein multiple different types of accessory devices connectable to the host computing device have different resistor values used to distinguish between the different types of accessory devices.

12. A host computing device comprising:
one or more microcontrollers;
one or more computer-readable storage media storing instructions that when executed via the one or more microcontrollers cause the host computing device to perform operations including:
managing power exchange between the host computing device and an accessory device connected to the host computing device in accordance with settings for at least a power exchange direction and current limits defined by an active power management contract;
maintaining a data structure configured to associate the accessory device with the settings for the active power management contract including at least the power exchange direction and the current limits defined by the active power management contract;
monitoring to detect a change in conditions of the power exchange between the host computing device and the accessory device;
monitoring to detect receipt of a power contract update message from the accessory device indicating a change in the conditions of the power exchange between the host computing device and the accessory device;
determining whether the change to the conditions of the power exchange prompts modification of the active power exchange contract; and
when the change to the conditions of the power exchange prompts the modification of the active power exchange contract:
updating the settings of the active power management contract for at least the power exchange direction and the current limits in accordance with the conditions; and
modifying the data structure to reflect the updated settings of the active power management contract.

13. A host computing device as described in claim 12, wherein the instructions are implemented via firmware corresponding to the one or more microcontrollers of the host computing device and the one or more microcontrollers are configured to operate independently of a primary processing system of the host computing device.

14. A host computing device as described in claim 12, wherein the accessory device includes a peripheral device hub and wherein the change to the conditions of the power exchange prompts modification of the active power contract settings includes a change in a number of peripheral devices attached to the peripheral device hub.

15. A host computing device as described in claim 12, wherein the current limits include a maximum for power delivery from the accessory device to the host computing device.

16. A host computing device as described in claim 12, wherein the one or more microcontrollers include a power controller configured to perform said managing the power exchange and said monitoring to detect the change in conditions, and wherein the conditions include relative states of charge, power loads, and power source availability.

17. An accessory device comprising:
one or more hardware elements, including a computer processor;
one or more executable modules stored as executable instructions that when executed via the computer processor cause the accessory device to perform operations including:
supplying data to a host computing device indicative of an identity of the accessory device;
exchanging power with the host computing device in accordance with settings defined by an active power contract associated with the identity of the accessory device, the settings including current limits and a power exchange direction;
monitoring to detect a change in power exchange conditions between the host computing device and the accessory device;
determining whether the change to the power exchange conditions prompts modification of the active power exchange contract and
when the change to the power exchange conditions prompts the modification of the active power exchange contract:
communicating a power contract update message to the host computing device to adjust the settings, the power contract update message specifying values for the power exchange direction and the current limits based on the power exchange conditions detected by the monitoring;
detecting receipt of a power contract update message from the host computing device, the power contract update message indicating changes to the settings of the active power contract and the power contract update message indicating the power exchange conditions that prompt adjusting the settings; and
subsequently exchanging the power with the host computing device in accordance with the changes to the settings for the current limits and the power exchange direction defined by an updated active power contract.

18. An accessory device as recited in claim 17, wherein supplying the data indicative of the identity of the accessory device comprises exposing a resistor value indicative of the identity for reading by the host computing device.

19. An accessory device as recited in claim 17, wherein the power exchange conditions include at least a power load supplied by the accessory device to power peripheral devices connected via the accessory device.

20. An accessory device as recited in claim 17, wherein the power exchange conditions include at least an amount of power available to the accessory device via internal and external power supplies.

\* \* \* \* \*